United States Patent
Berg et al.

(10) Patent No.: US 9,042,202 B2
(45) Date of Patent: May 26, 2015

(54) SPLIT-ELEMENT OPTICAL HYDROPHONE

(75) Inventors: Arne Berg, Kattem (NO); Jon Thomas Kringlebotn, Trondheim (NO)

(73) Assignee: Optoplan AS, Tiller (NO)

( * ) Notice: Subject to any disclaimer, the term of this patent is extended or adjusted under 35 U.S.C. 154(b) by 560 days.

(21) Appl. No.: 12/482,221

(22) Filed: Jun. 10, 2009

(65) Prior Publication Data

US 2010/0313659 A1    Dec. 16, 2010

(51) Int. Cl.
  *G01V 1/38*  (2006.01)
  *G01V 13/00*  (2006.01)
  *G01P 15/093*  (2006.01)
  *G01V 1/20*  (2006.01)

(52) U.S. Cl.
  CPC .............. *G01V 13/00* (2013.01); *G01P 15/093* (2013.01); *G01V 1/201* (2013.01)

(58) Field of Classification Search
  CPC ....... G01P 15/093; G01V 1/201; G01V 13/00
  USPC ...................... 367/15, 20, 149, 154, 178, 188; 250/227.14–227.19
  See application file for complete search history.

(56) References Cited

U.S. PATENT DOCUMENTS

| | | |
|---|---|---|
| 3,531,760 A | 9/1970 | Whitfill, Jr. |
| 3,781,778 A | 12/1973 | Sawin et al. |
| 3,900,543 A | 8/1975 | Davis |
| 4,648,083 A | 3/1987 | Giallorenzi |
| 4,832,443 A | 5/1989 | Cameron et al. |
| 4,910,715 A | 3/1990 | Savit |
| 4,951,265 A | 8/1990 | Buckes |
| 5,141,796 A | 8/1992 | Harvey |
| 5,155,548 A | 10/1992 | Danver et al. |
| 5,468,913 A | 11/1995 | Seaman et al. |
| 5,475,216 A | 12/1995 | Danver et al. |

(Continued)

FOREIGN PATENT DOCUMENTS

| | | |
|---|---|---|
| EP | 0814326 | 12/1997 |
| GB | 2096340 | 10/1982 |

(Continued)

OTHER PUBLICATIONS

Sabeus, Inc. 2006/2007 Corporate Overview, See p. 29, <www.sabeus.com>.

(Continued)

*Primary Examiner* — Krystine Breier
(74) *Attorney, Agent, or Firm* — Pearl Cohen Zedek Latzer Baratz LLP

(57) ABSTRACT

There is provided a solid seismic streamer cable for use in seismic surveying in marine environments. The streamer is characterized by a buffer layer 2 which is provided with a cut-out 50 and a sensor element arranged in the cut-out 50. There is also provided an associated hydrophone for integration into the seismic streamer cable. The hydrophone is characteristic in a split-element sensor base 10, 11 being suited for efficient mounting into the cut-outs 50 of the seismic cable. There is also provided an associated accelerometer for integration into the seismic streamer cable. The accelerometer is characteristic by a split-element sensor base 30, 35 for being efficiently arranged into the cut-outs 50 of the seismic cable. A method of producing a seismic streamer cable according to the invention incorporating a hydrophone or accelerometer according to the invention is also provided.

8 Claims, 17 Drawing Sheets

(56) References Cited

U.S. PATENT DOCUMENTS

| | | | |
|---|---|---|---|
| 5,737,278 A * | 4/1998 | Frederick et al. | 367/149 |
| 5,745,436 A | 4/1998 | Bittleston | |
| 5,796,676 A | 8/1998 | Chang et al. | |
| 5,867,451 A | 2/1999 | Chang et al. | |
| 5,943,293 A | 8/1999 | Luscombe et al. | |
| 6,118,733 A | 9/2000 | Ames | |
| 6,128,251 A | 10/2000 | Erath et al. | |
| 6,151,277 A * | 11/2000 | Erath et al. | 367/173 |
| 6,188,646 B1 | 2/2001 | Luscombe et al. | |
| 6,211,964 B1 | 4/2001 | Luscombe et al. | |
| 6,262,944 B1 | 7/2001 | Meyer et al. | |
| 6,278,823 B1 | 8/2001 | Goldner et al. | |
| 6,333,897 B1 | 12/2001 | Knudsen et al. | |
| 6,333,898 B1 | 12/2001 | Knudsen et al. | |
| 6,510,103 B1 | 1/2003 | Knudsen et al. | |
| 7,224,872 B2 | 5/2007 | Goldner et al. | |
| 7,345,952 B2 * | 3/2008 | Nash et al. | 367/149 |
| 7,460,434 B2 | 12/2008 | Stenzel et al. | |
| 7,840,105 B2 | 11/2010 | Goldner et al. | |
| 8,064,286 B2 | 11/2011 | Ronnekleiv et al. | |
| 2001/0013934 A1 | 8/2001 | Varnham et al. | |
| 2002/0001442 A1 | 1/2002 | Couvrie et al. | |
| 2003/0072515 A1 | 4/2003 | Ames et al. | |
| 2004/0184352 A1 | 9/2004 | Woo | |
| 2005/0122838 A1 | 6/2005 | Maas et al. | |
| 2005/0253049 A1 * | 11/2005 | Westhall et al. | 250/227.14 |
| 2006/0209633 A1 | 9/2006 | George et al. | |
| 2007/0258319 A1 | 11/2007 | Ronnekleiv et al. | |
| 2008/0123467 A1 | 5/2008 | Ronnekleiv et al. | |

FOREIGN PATENT DOCUMENTS

| | | |
|---|---|---|
| GB | 2327756 A | 2/1999 |
| GB | 2378758 A | 2/2003 |
| GB | 2386183 | 9/2003 |
| GB | 2395273 | 5/2004 |
| GB | 2395273 A | 5/2004 |
| GB | 2417627 A | 3/2006 |
| GB | 2449941 | 12/2008 |
| WO | 9832033 A1 | 7/1998 |
| WO | 9924790 A1 | 5/1999 |
| WO | 03074981 A2 | 9/2003 |
| WO | 2007087093 A2 | 8/2007 |
| WO | 2008149059 A1 | 12/2008 |

OTHER PUBLICATIONS

European Search Report dated Jan. 10, 2011 for European Application No. EP 09162352.0.

European Search Report for Application No. EP 09 16 2352, Dated May 3, 2010.

Office Action issued by the United States Patent and Trademark Office for U.S. Appl. No. 13/302,026 dated Jan. 7, 2013.

Office Action issued by the United States Patent and Trademark Office for U.S. Appl. No. 13/302,026 dated May 14, 2012.

* cited by examiner

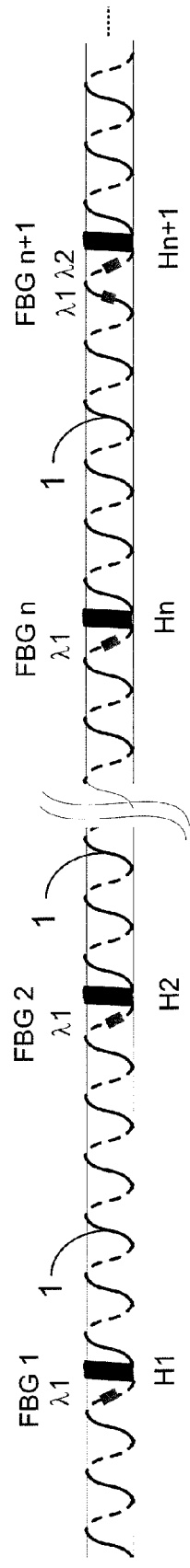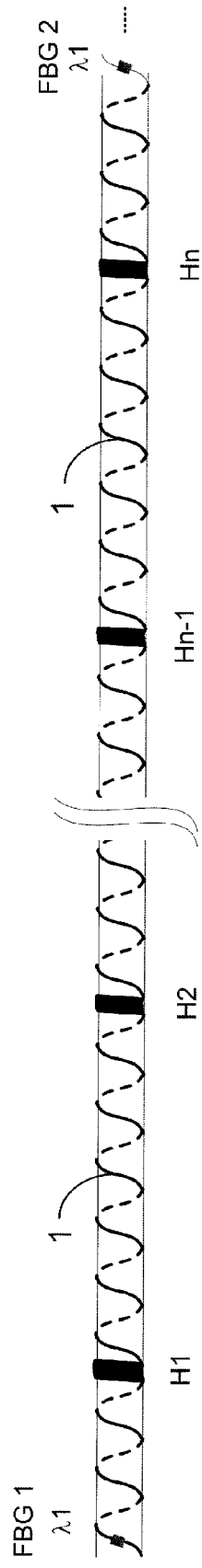

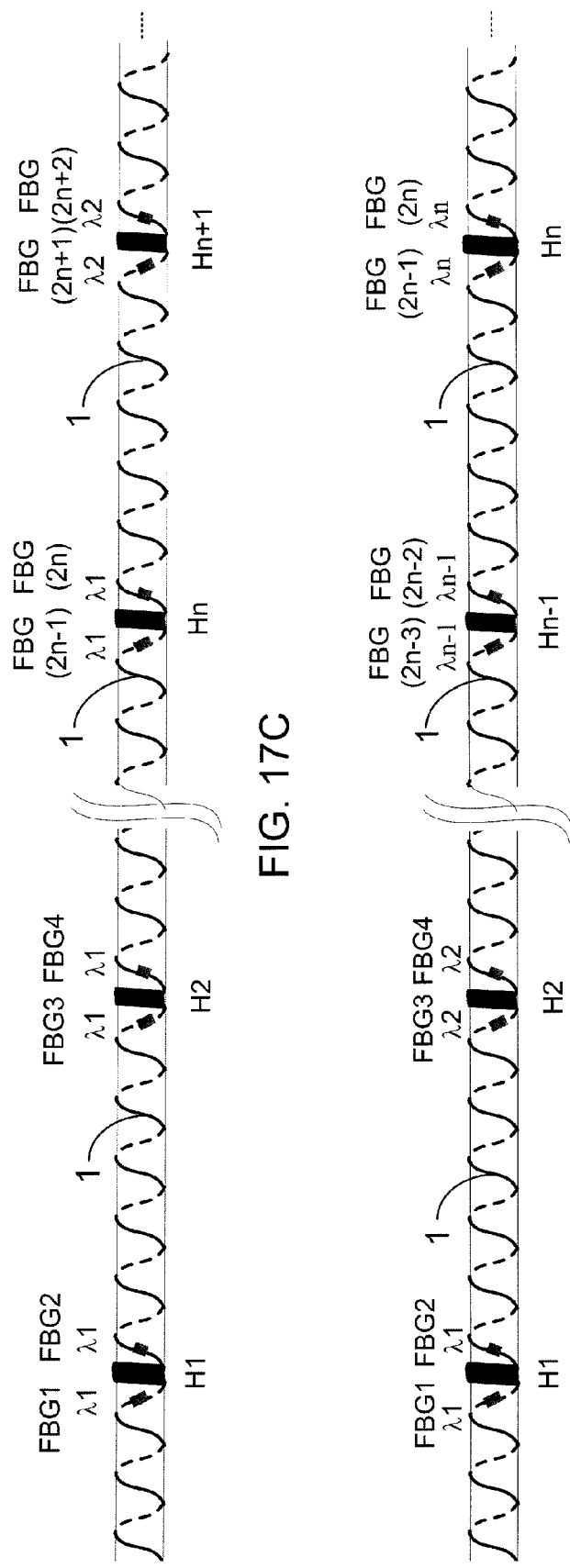

SPLIT-ELEMENT OPTICAL HYDROPHONE

The present invention is related to seismic streamer cables for use in acquisition of seismic information. More particularly, the present invention is related to a fibre optic streamer for marine seismic surveying. Even more particularly the present invention relates to a fibre optic hydrophone, a fibre optic accelerometer and a seismic streamer cable which incorporates the hydrophone and accelerometer. The present invention also relates to methods of producing streamers incorporating the hydrophone and accelerometer according to the invention.

BACKGROUND OF THE INVENTION

The most common method of acquiring seismic data at offshore locations is by towing a seismic streamer cable behind a vessel, and collection data corresponding to acoustic waves reflected from underground formations. The streamers which dominate the market today are based on electrical hydrophones built into cables which are towed behind vessels. The main limitations of such streamers are connected to the reliability and cost of operating such streamers.

A typical streamer typically may comprise a number of components, typically: a streamer cable, a lead-in cable, birds (depth and steering controllers of cable), acoustic underwater positioning network, head and tail end sections (isolating the active streamer from vibrations (etc.), head and tail buoys, recording system for the QC, data storage and management, back deck handling equipment, etc. The present disclosure focuses on the design of the streamer cable and its components.

Hydrophones and accelerometers can be realized in fibre optic technology however, such hydrophones and accelerometers have not found wide application in seismic streamers. Known examples of fibre optic hydrophones and streamer arrangements are described below.

PRIOR ART

It is well known in the field that presently available electrical streamers have limitations due to reliability issues. The relatively large diameter (typically >50 mm diameter) gives a limitation in relation to required storage space on the vessels, and a large diameter sets a requirement on a large required force (and a large vessel) during operation in order to tow a long streamer through the water.

This Applicant's own prior United States patent application publication 2008/0123467 A1 describes one example of a prior art system for marine seismic exploration surveying where a seismic streamer cable is built up from an array of cable modules. Each cable module contains a number of sensors.

U.S. Pat. No. 7,224,872 B2 (Goldner et al.) relates to a design and construction technique for an array of fibre optic hydrophones or geophones. The fibre optic hydrophone is formed by winding optical fibres around a continuous, flexible cylindrical core which is made of an elastomeric material that can be filled with a specified percentage of voided plastic microspheres.

G.B. 2 395 273 A describes a seismic cable with continuous stress member and sensor modules wherein the stress member extends continuously through the sensor module.

For most practical purposes, it is important to maintain the diameter of a seismic streamer cable as low as possible in order to increase the length of cable that can be towed by a seismic vessel or in order to reduce required storage space and the load on all types of equipment associated with handling of the seismic cable.

Overall efficiency of seismic operations is expected to be improved if satisfactory seismic surveying systems with cables of lower diameters could provide satisfactory functionality and reliability in operation.

OBJECT OF THE INVENTION

It, thus, is an object of the invention to provide a low-diameter seismic streamer cable design which can be efficiently produced and which has high reliability in operation.

SUMMARY OF THE INVENTION

In a first aspect of the invention, there is provided a seismic streamer cable comprising a buffer layer provided with one or more cut-outs and a sensor element arranged in one or more of the cut-outs.

The sensor element of the streamer cable may be designed as a split-element sensor realized in its most basic form as a combination of a split-element sensor base and an optical fibre sensor coil. Split-element sensor covers are arranged over the sensor base and optical fibre sensor coils as protection of the optical fibres.

The seismic streamer cable according to the invention, comprises an optical fibre which includes the sensor coil(s). The optical fibre also includes optical fibre Bragg gratings (FBG) forming optical fibre interferometers.

In some embodiments of the streamer cable according to the invention, the optical fibre includes multiple fibre Bragg gratings $FBG_1$-$FBG_n$. The Bragg gratings are may be arranged so that for each hydrophone (sensor) coil there is a corresponding pair of FBGs, one FBG on each side of the hydrophone coil.

In some embodiments of the streamer cable according to the invention, the optical fibre comprises an intermediate FBG between two neighbouring sensor coils, the intermediate FBG being common to FBG pairs, each pair associated with one of the sensor coils.

In some embodiments of the streamer cable according to the invention, several hydrophone (sensor) coils $H_1$-$H_n$ are arranged on the cable between two fibre Bragg gratings $FBG_1$-$FBG_2$.

In some embodiments of the streamer cable according to the invention, the FBGs in the optical fibre located on the fibre on or near two facing sides of two neighbouring hydrophones may be produced to have the same wavelength.

In some embodiments of the streamer cable according to the invention, a pair of FBGs in the optical fibre, one of the FBGs of the pair located in the optical fibre on each side of the hydrophone (sensor) coil has the same Bragg wavelength. Another pair of FBGs on a neighbouring hydrophone (sensor) coil, with one FBG on each side of the neighbouring hydrophone (sensor) coil may have a different Bragg wavelength.

The seismic streamer cable comprises a core part which includes the buffer layer. The core part of the cable may be defined as a minimum combination of one or more cable armouring elements and a buffer layer which can be provided with slots for allocating sensor and/or reference elements.

The buffer layer is typically obtained by providing a longitudinal, continuous buffer layer and providing the buffer layer with cut-outs at selected positions along the core part. The cut-outs can be shaped as a generally tubular void. A protective layer may be arranged for protecting the core part and any sensor and/or reference element(s) arranged in the slots.

In some embodiments of the streamer cable according to the invention, optical fibre wound on the buffer layer between sensors (hydrophones and/or accelerometers) acts as a distributed strain sensor, the strain sensor being formed by the wound optical fibre between two spaced FBGs arranged one on each side of two neighbouring sensors. The two FBGs defining the distributed strain sensor may be produced to have the same wavelengths.

The sensor element may comprise a fibre optic hydrophone and/or a fibre optic accelerometer. In some embodiments, at least one reference element may be arranged in at least one of the cut-outs.

In some embodiments of the streamer cable according to the invention the core part comprises is realized as multilayer structure. The core part, the sensor element and the protective layer are then preferably co-axially aligned.

In still further embodiments of the streamer cable according to the invention, optical fibre is arranged loosely with an excess length in grooves of the buffer layer to effectively decouple the optical fibre and optical fibre Bragg gratings in the parts of optical fibre in the grooves from strain in the seismic cable.

The groove may, in some embodiments of the streamer cable according to the invention, be filled with grease, wax or another material which can be hardened by cooling prior to coiling, such that at operating temperatures the material is softened thereby allowing the fibre to sink into the material, resulting in an excess fibre length.

In other embodiments, the groove has been filled with an initially hard and chemically dissolvable material which can be removed by a chemical process after fibre winding.

In yet further embodiments of the streamer cable, the optical fibre is arranged onto a shrinkable element arranged in the buffer layer grooves.

It will be understood by a person skilled in the art upon reading this description that combinations of the above techniques for providing a loosely arranged optical fibre in grooves in the buffer layer are possible in order to obtain an excess length of optical fibre.

In a second aspect of the invention, there is provided a hydrophone for integration into a seismic streamer cable. The hydrophone comprises a split-element sensor base designed for being arranged into cut-outs in a buffer layer of a seismic cable. The split-element sensor base of the hydrophone comprises a set of inner parts, which may be stiff, and a set of compliant outer parts, designed so as to form a cavity, preferably air-filled when assembled together on a streamer cable. An optical fibre is coiled onto the compliant part of the split-element sensor base so as to form a hydrophone being sensitive to pressure variations. The sensor base of the hydrophone may also be referred to as the hydrophone mandrel.

In some embodiments of the hydrophone according to the invention, the split-element sensor base comprises two inner stiff parts attached together to form an inner tube and two compliant outer parts being rotated with respect to the inner parts and attached together to the inner tube so as to form an outer tube, whereby the cavity is formed between the inner and outer tubes when the hydrophone base is mounted onto a streamer cable.

In preferable embodiments of the hydrophone according to the invention, each one of the inner parts and one of the outer parts are pre-assembled. This way the inner and outer parts may be assembled pair-wise so that a cavity is formed by each pair prior to being mounted on a streamer cable.

In some embodiments of the hydrophone according to the invention, the outer cylindrical parts are provided with helical grooves for allocating and guiding the fibre over part of the hydrophone.

Further embodiments of the hydrophone, according to the invention, comprise covers which serve to protect the compliant outer cylindrical part and the optical fibre of the hydrophone from pressure waves (seismic signal) and other external influences.

Some embodiments of the hydrophone, according to the invention, comprise a channel, possibly an optical fibre duct, that extends from a space containing the fibre and to oil or gel filled voids between the cable core part and an outer protective layer or cladding of the seismic cable. This channel serves as a low-pass acoustic filter for coupling from the external environment to the hydrophone. The channel or the fibre duct also provides oil-filling of the sensor fibre volume, and helps to dampen high frequency acoustic signals from entering the enclosed cavity.

In further embodiments of the hydrophone according to the invention, the compliant outer cylindrical parts form a plastic tube wherein the cavity serves as an air backing.

In preferable embodiments of the hydrophone according to the invention, the stiff inner parts and compliant outer parts are generally shaped as halves of a cylinder in order to fit smoothly around the core part when assembled.

In a third aspect of the invention, there is provided an accelerometer for integration into a seismic streamer cable. The accelerometer is characteristic in a split-element sensor base designed for being arranged into cut-outs in a buffer layer of a seismic cable. The split-element sensor base of the accelerometer includes a first part provided with first attachment means for being fixed to a streamer cable core part and a second part for attachment to the first part. Second attachment means are arranged to movably couple the second part to the first part. An optical fibre is coiled around outer surfaces of the accelerometer base so as to be strained when the accelerometer is subjected to an acceleration causing the second part to move in relation to the first part.

In some embodiments of the accelerometer according to the invention, the first attachment means comprises a glue joint.

In some embodiments of the accelerometer according to the invention, the second attachment means comprises a flexible element, preferably a blade shaped metal spring which is attached into a first longitudinal slit in the first part and into a corresponding second slit in the second part, whereby the second part is movably suspended by the flexible element.

In some embodiments of the accelerometer according to the invention, the second part is mounted so as to define a surrounding space whereby the second part is to move about an axis defined by the second attachment means.

In some embodiments of the accelerometer according to the invention, two end sections are arranged at first and second ends of the accelerometer. The end sections serve to close the said surrounding space when the accelerometer is arranged as part of a streamer cable. The end sections may be formed as semicircular sections of an annulus.

In some embodiments of the accelerometer according to the invention, accelerometer covers are provided which serve to protect the compliant outer cylindrical part and the optical fibre of the hydrophone from pressure waves (seismic signals) and other external influences.

In some embodiments of the accelerometer according to the invention, the first part is provided with a channel, possibly a fibre duct, that extends from a space containing the fibre coil of the accelerometer and to oil or gel filled voids between the cable core part and an outer protective layer or cladding of the seismic cable so as to equalize the pressure between said space and voids. The channel also enables oil or gel filling of a space surrounding the accelerometer, which serves to dampen possible resonances in the accelerometer.

In some embodiments of the accelerometer according to the invention, the first and second parts are cylindrically shaped, preferably half cylinders in order to fit smoothly together around the core part when assembled.

In a fourth aspect of the invention, there is provided a method of producing a seismic streamer cable. The method comprises providing a buffer layer of a cable core part with cut-outs at selected sensor locations of the cable. A split-element sensor base element is arranged in one or more of the cut-outs. In the context of this disclosure a sensor base element should be understood to mean the mechanical parts of a fibre optic sensor, e.g., the part of a fibre-optic hydrophone or a fibre-optic accelerometer which forms the base onto which the optical fibre sensor coil is coiled.

The optical fibre may be arranged on the cable core part and on the split-element sensor base element so as to form the sensor element, typically before arranging the protective cladding.

In an embodiment of the method of producing a streamer cable according to the invention, at least a part of an optical fibre is arranged in grooves of the buffer layer by a method which provides a larger effective coiling diameter during coiling than when the cable is completed to obtain a fibre excess length. In some embodiments the depth of the groove may be increased by removing material after the optical fibre is arranged in the groove.

In further embodiments of the method of producing a streamer cable, according to the invention, comprises filling the groove with grease, wax or another material which may be hardened by cooling, and allowing the fibre to be coiled onto the material when hard and allowing the fibre to sink into the material as it softens when brought back to an operating temperature, typically the temperature of the sea.

In still further embodiments of the method of producing a streamer cable according to the invention, there is provided an excess optical fibre in the grooves by coiling the optical fibre onto an initially strained central structure of the cable which is subsequently relaxed.

In yet further embodiments of the method of producing a seismic streamer cable according to the invention, the effective depth of the groove is increased by softening a material under the optical fibre after it has been arranged in the groove.

A protective cladding may be arranged to cover the core part, the sensor base element and the optical fibre, once the optical fibre has been coiled and arranged onto the core part and sensor element in its permanent arrangement.

In the case that the optical fibre of the sensor forms a hydrophone, i.e., a type of pressure sensor, the protective cladding/layer is designed so as to transmit pressure variations. In the case that the optical fibre is arranged to form an accelerometer the protective cladding/layer does not need to be designed to transmit pressure variations. The protective layer is in a preferable embodiment of the seismic cable designed with a longitudinally uniform outer profile.

In some embodiments of the method according to the invention, the cut-outs in the buffer layer, the buffer layer being a part of a cable core part are provided in a machining process which removes parts of the buffer layer.

Embodiments of the method according to the invention, the cut-outs may be provided in a periodic arrangement or a regularly spaced manner along the streamer cable.

In further preferable embodiments of the method for providing a seismic cable according to the invention, a sensor reference is placed in one of the cut-outs. The sensor reference may comprise a combination of at least two inner reference mandrel parts covered by at least two reference cover parts and a an optical fibre reference section coiled onto the reference mandrel parts in a space between the reference mandrel parts and the reference cover parts. The inner reference mandrel parts are stiff, and may be produced from a metal, such as steel.

In a still further preferable embodiment of the method for providing a seismic cable according to the invention, the cable is provided with an outer protective layer/cladding and/ or a protective outer jacket, for example by an extrusion process.

In some embodiments of the method for providing a seismic cable according to the invention, grooves are provided in the buffer layer for allocating, possibly in a loose manner, at least sections of the optical fibre, the grooves may be provided in the extrusion step producing the buffer layer. The grooves may be helically shaped on the surface of the buffer layer.

By providing, according to the invention, the seismic cable and the method for producing the seismic cable, as well as a corresponding hydrophone and an accelerometer it is possible to produce a complete seismic cable in an efficient manner. The components fit smoothly together and are assembled easily onto a cable core part. It is an advantage that all the basic sensor components except the optical fibre may be assembled onto the cable core part before the optical fibre is mounted. This means that the mounting of a sensor fibre, preferably including fibre Bragg gratings (FBGs) can be made in one, continuous winding operation at a late stage in the production process.

When designing the hydrophone and accelerometer as described, it is possible to achieve a compact cable having a small diameter, and both storage space and costs are reduced in manufacturing and handling of the seismic cable. A major benefit of a seismic cable with a small diameter is that the cable may be towed in water with much less drag forces, thus significantly reducing fuel consumption of the towing vessel and contributing to a reduction in emission of exhaust gases into the environment.

Another advantage of the present invention is that it allows an increase in the number or total length of streamer cables that can be pulled by a given boat, thereby improving the data capture and spatial resolution by more densely spacing the sensors or an increased total number of available sensors. Still another advantage is the possibility that a streamer operation can be performed in a more efficient manner with a streamer cable of low diameter.

The different aspects of the invention will be described in more detail in the following by referring to the appended drawings, briefly summarized below:

DRAWINGS

FIG. 17A-D illustrates the placement of fibre Bragg gratings in various embodiments of the streamer according to the invention.

DETAILED DESCRIPTION

Figure 1:
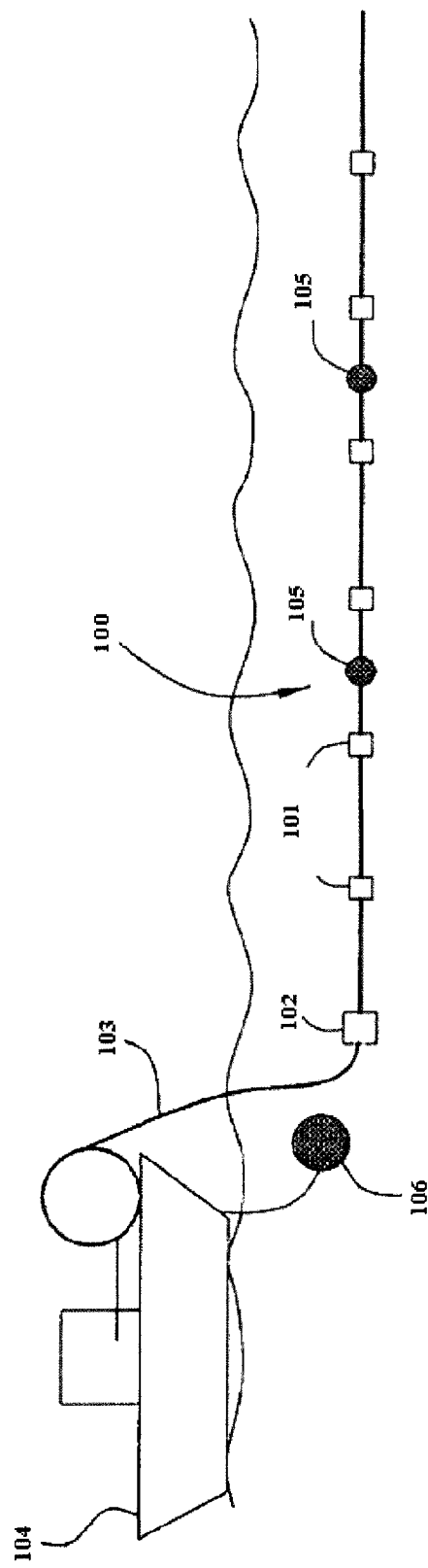
FIG. 1 illustrates an exemplary prior art fibre optic streamer cable of built up from an array of cable modules.

FIG. 1 serves to illustrate a typical setting for the present invention by using an illustration taken from United States patent application publication 2008/0123467 A1. A streamer cable 100 containing a number of array cable modules 101 are connected via a connection node 102 to a lead-in cable 103. The lead-in cable 103 is connected to a boat 104 which tows the streamer cable 100 over a subterranean region to be surveyed. The seismic cable 100 normally includes birds 105 which serve to control the position of the seismic cable 100 in the water. Connected to the boat 104 is also a seismic source 106, such as for example an air gun emits a pulse of acoustic energy which is detected by sensors (not shown) of the streamer cable 100.

Figure 2:
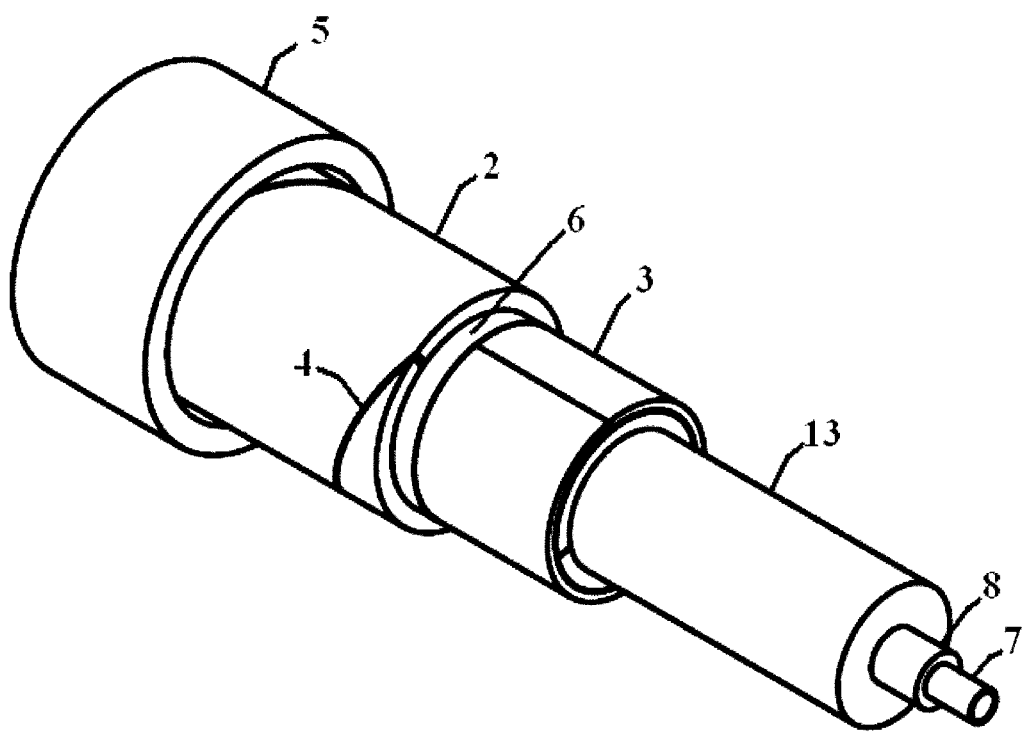
FIG. 2 is an isometric view of a streamer cable according to the invention without the optical fibre.

FIG. 2 illustrates one exemplary design of seismic cable according to the invention wherein a core part is designed as a layered structure which in its most basic form includes an armour layer 13 and a buffer layer 2.

In the centre of the streamer cable the core part may comprise a steel tube 7 which can accommodate one or more auxiliary optical fibres (not shown) for connecting to sensors further down the streamer cable. Such auxiliary optical fibres need to be laid within the tube 7 with sufficient excess length to keep the fibres unstrained during cable installation and operation which can cause considerable strain and hence elongation of the cable.

The tube is preferably made from steel and may be protected by a coating layer 8 to increase the strength with respect to crush and impact. Between the tube 7 and the coating layer 8 the core part may incorporate a thin conductive layer with insulation for supplying electrical power to tail buoys or bird signaling/steering.

Outside the protection tube, the core part includes the armour layer 13 which can be made from a layer of yarn, preferably an Aramide™ yarn or another similar yarn to form a strength element. The strength element(s) are typically covered by tape. The strength elements of the armour layer 13 are preferably made from a synthetic material due to buoyancy requirements. The buffer layer 2 of the core part is arranged onto the armour layer 13 (onto strength member element and optional tape layer).

FIG. 2 illustrates the buffer layer 2 onto which an optical fibre is wound. The optical fibre is not illustrated on FIG. 2, however, a groove 4 in the buffer layer illustrates where the optical fibre is arranged. The buffer layer 2 may be an extruded structure, for example produced from a plastic, which can be partially removed from the cable in short sections to provide cut-outs 50 at selected locations along the cable, as illustrated by the single cut-out on FIG. 16A, the cut-outs 50 defining a space for allocating a sensor base element or a reference mandrel onto which the optical fibre 1 can be wound in order to provide a sensor or reference structure, respectively. On FIG. 2, a hydrophone structure 3 is illustrated as arranged in a cut-out provided in the buffer layer 2.

Figure 16A:
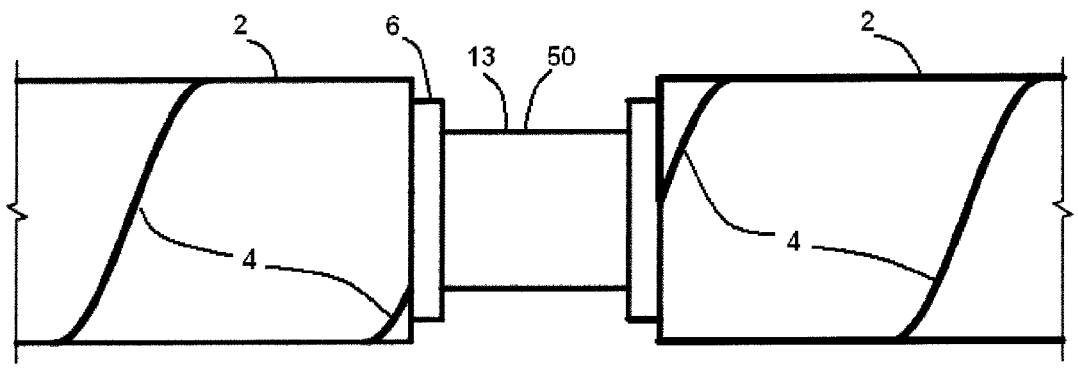
FIG. 16A shows a side view of the mandrel arranged on the streamer cable showing grooves for the optical fibre.

The cut-outs in the buffer layer 2 may be produced so as to have a stepped profile in the longitudinal direction of the cable, as illustrated by the step 6 on FIGS. 2 and 16A. The step 6 provides a step in a transition region between the cut-out 50 and an un-cut section of the buffer layer 2.

The purpose of the buffer layer 2 is to protect the optical fibre 1 running between the sensors and reference mandrels in a groove in the buffer layer and to optimize buoyancy of the seismic cable when deployed in water. The optical fibre may be loosely arranged in grooves 4 in the outer surface of the buffer layer 2 for protection. The grooves 4 may for example be produced in a helical form around an outer surface of the buffer layer 2. The buffer layer 2 and completed sensor or reference mandrels may be designed so as to have the same outer diameter on the finished seismic cable. The buffer layer 2 and completed sensor or reference mandrels may be designed so that the fibre runs in substantially a cylindrical layer. In the sections of the buffer layer 2 between the sensors and/or reference mandrel the optical fibre may be wound with a large pitch and loosely arranged in the grooves 4 between the sensors. On the sensor or reference mandrel, however, the optical fibre may be wound with a minimum pitch and so as to form a tightly wound sensor or reference element.

The optical fibre may comprise one or more fibre Bragg gratings to provide optically reflective elements forming fibre optic interferometers operating as sensing elements. The section of optical fibre placed in the grooves 4 may typically comprise discrete fibre Bragg gratings (FBGs) arranged near or close to the ends of the optical fibres of the sensor or reference elements, to define sensor and reference interferometers. The optical fibre in the grooves 4 preferably has an excess length so as to be loosely arranged and to effectively decouple the gratings from strain in the seismic cable. The optical fibre that is placed in the grooves 4 and includes the discrete FBGs are preferably arranged in a loose manner so that the FBGs are as little affected as possible by any strain during handling of the seismic cable in order to avoid undesirable shifts in the reflected wavelengths.

One manner of arranging the fibre gratings so as to be decoupled from fibre strain is to arrange the fibre section with the grating in a loose manner in a transition region between the low pitch sensor or reference coil and the high pitch regions of the buffer layer and fix the loose fibre with the grating on both sides of the grating in order to decouple any strain from the grating.

Due to the fact that the sensors are stiffer than the rest of the cable, the fibre is preferably coiled with a medium pitch (larger than the sensor pitch and lower than the large pith of the buffer layer) in the transition regions between the buffer layer and the sensors in order to avoid straining the fibre when bending the streamer cable.

There will typically be one grating between each sensor, where all gratings in a sensor group, which typically consists of 5-10 sensors along the same fibre, will have the same wavelength to allow time multiplexing of the sensors. With this configuration, the fibre coiled in the grooves along the buffer layer between the sensors will be part of the active sensor fibre.

Several sensor groups can be wavelength multiplexed along the same fibre by having subsequent sensor groups along the same fibre with different grating wavelengths.

In some embodiments, optical fibre may be coiled so as to arrange a grating on each side of a sensor, for example by provide the pair of gratings at a sensor with the same wavelength. In this case, the fibre coiled in the grooves along the buffer layer between the sensors will not be part of the active sensor fibre.

With a pair of gratings for each sensor, it is also possible for the fibre between sensors to form separate interferometers with gratings located close by the sensors, provided that the gratings at each side of the fibre between the sensors have the same wavelength.

The combination of the sensor and reference elements 3, including all of the associated optical fibre lengths running in the grooves of the buffer layer 2, can be referred to as the fibre layer. Outside the fibre layer there will typically be provided an outer cladding 5 which protects the inner elements, while still being transparent to a seismic signal. Any gap between the outer cladding 5 and a sensor or reference element 3 is preferably filled with a gel, saturated with an oil, or otherwise suitably filled with an acoustically transparent or pressure transferring material.

Figure 3:
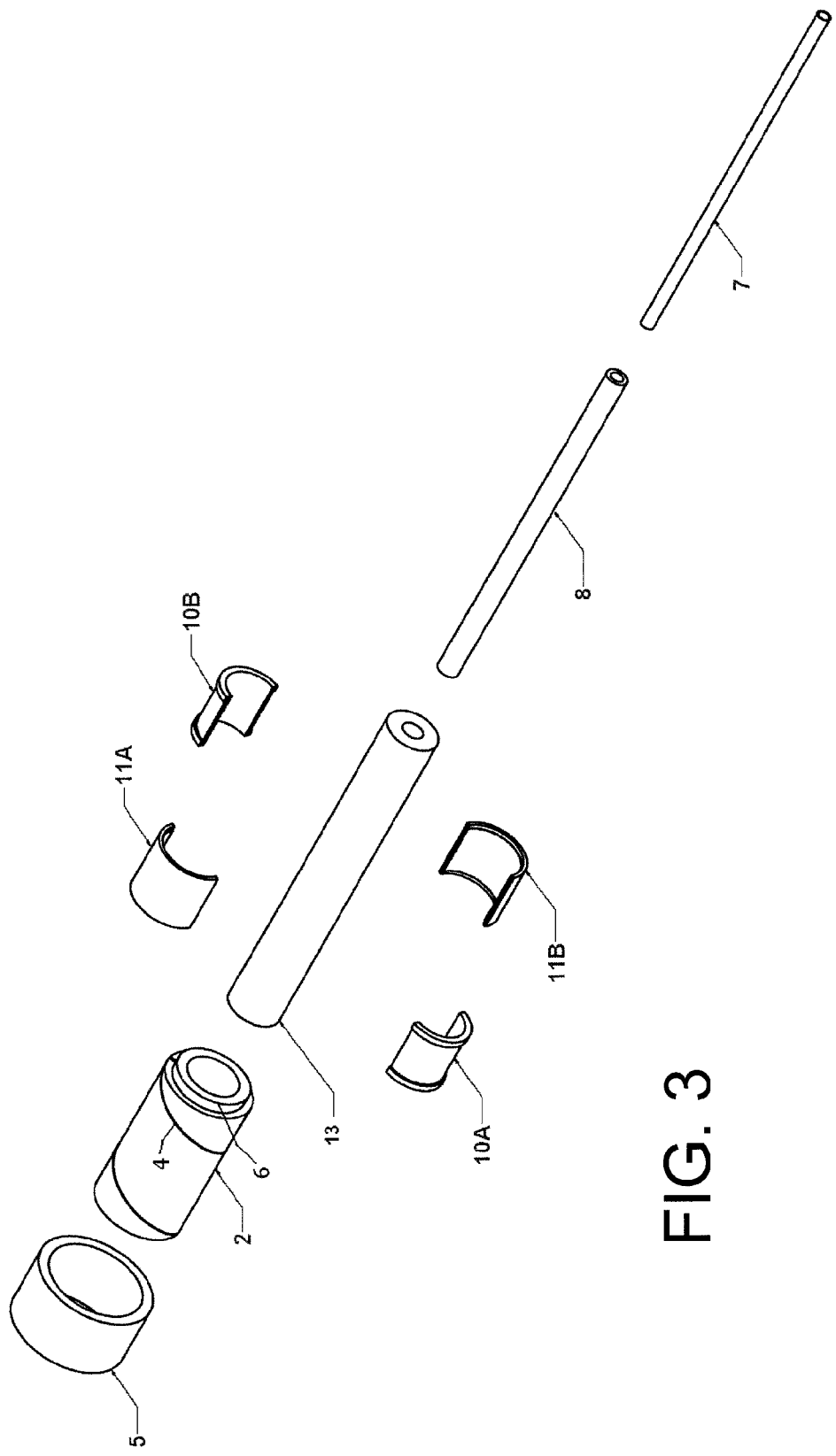
FIG. 3 is an exploded view of the streamer of FIG. 1 without the optical fibre.

FIG. 3 shows the different layers of the seismic cable of FIG. 2, in an exploded view for illustrative purposes.

Figure 4:
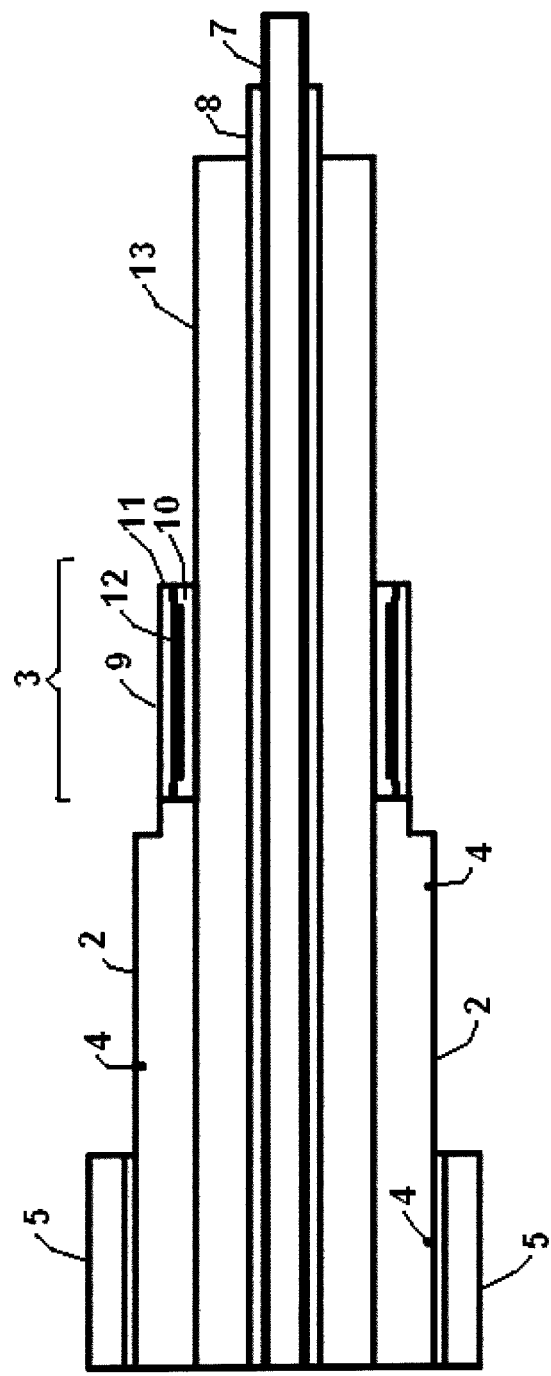
FIG. 4 is a longitudinal cross section of the streamer cable of FIG. 1.

FIG. 4 illustrates that a tightly wound sensor section 9 of the optical fibre is wound onto a sensor structure 3 in the form of a hydrophone sensor base 10-12. The hydrophone sensor base 10-12 is placed below the outer cladding 5.

Figure 5A:
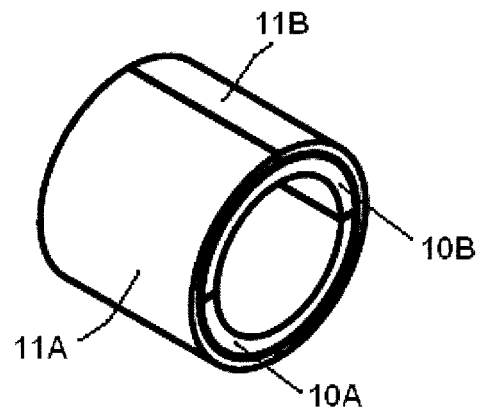
FIG. 5A is an isometric view of a hydrophone mandrel for the streamer cable.
Figure 5B:
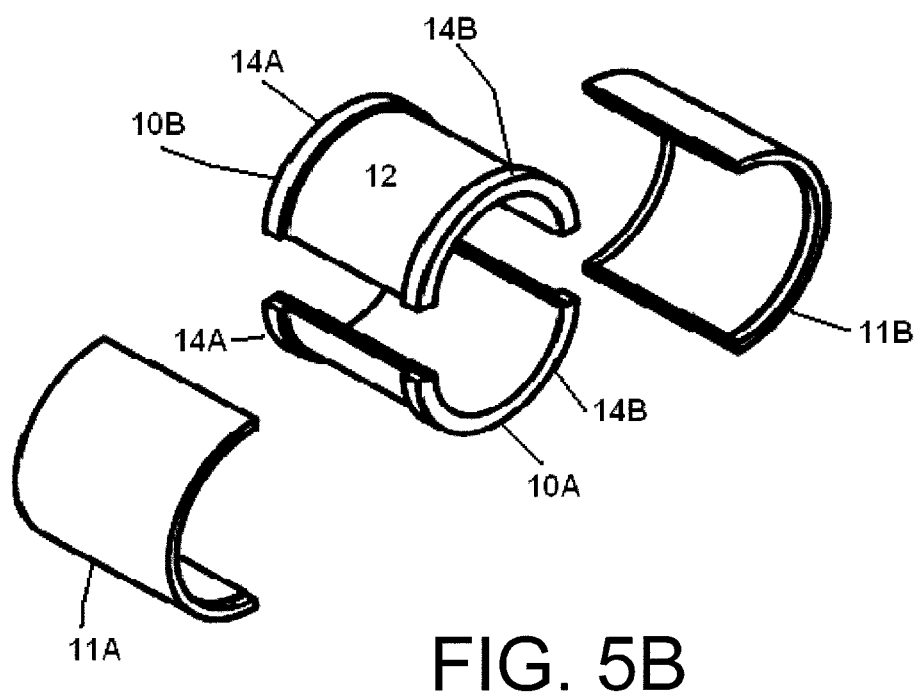
FIG. 5B is an exploded view of the hydrophone mandrel FIG. 4A.

FIGS. 5A and 5B illustrate how the hydrophone sensor base 10-12 provides an air-backed structure. The hydrophone sensor base $10_{A,B}$, $11_{A,B}$ comprises a set of inner, cylindrical parts $10_{A,B}$ and a set of compliant outer, cylindrical parts $11_{A,B}$. The combination of inner and outer, cylindrical parts $10_{A,B}$, $11_{A,B}$ is an example of how a sensor base may be designed from split-elements which may be conveniently and efficiently assembly onto the seismic cable.

The term split-element is here defined so as to refer to elements which when assembled together in the cut-outs 50 of the core part of the cable forms generally annular structures. As examples, split-elements are, for example, obtained by dividing a tube section or an annulus in two halves along a centre axis. By designing the sensors and reference elements from similar split-element components, an efficient and relatively simple assembly of the seismic streamer cable is obtained.

As will be understood, a reference element can also be assembled onto the seismic cable from similar split-element components, as will be exemplified in some more detail later. Designing most of the sensor and reference elements in the form of split-element structures is one aspect of the present invention The inner and outer cylindrical parts $10_{A,B}$, $11_{A,B}$ of FIGS. 5A and 5B are designed so at as to form an enclosure or cavity 12 filled with a compressible material such as air between them when assembled on a streamer cable. The inner cylindrical parts $10_{A,B}$ may as an example be designed with outwardly protruding shoulders $14_{A,B}$ at or near the top and bottom ends of the cylinder part, respectively, on the outside wall of the half cylinders, so as to form two continuous, circular shoulders running in a circular manner around the outside wall of the cylinder at each end of the cylinder when the two inner halves are mounted together, for example by gluing them together. Gluing them together in the cut-outs 50 effectively also attaches them and makes them an integral part of the seismic cable. When the outer cylindrical parts $11_{A,B}$ are glued to the inner cylindrical parts $10_{A,B}$ the cavity 12 is defined. The discrete fibre Bragg gratings (FBGs) of the hydrophone may be located in the part of the fibre passing over the shoulders $14_{A,B}$.

If the enclosure of cavity 12 is air filled, it provides the optical fibre which is coiled onto the outside of hydrophone base with an air-backing so as to form a hydrophone being sensitive to pressure variations. The cavity 12 which may be filled with air is thus below the sensor section 9 of the optical fibre 1. When the hydrophone base version of the sensor mandrel 10 is provided with a compliant structure which yields when subjected to pressure variations, typically by designing the air filled cavity with suitable dimensions and wall thickness, the sensor section 9 of optical fibre will change length depending on how the mandrel compresses and expands during pressure variations.

The inner cylindrical parts $10_{A,B}$ and the respective compliant outer cylindrical parts $11_{A,B}$ are shown to be rotated, for example by about 90 degrees, with respect to each other on FIGS. 5A-B.

Figure 6:
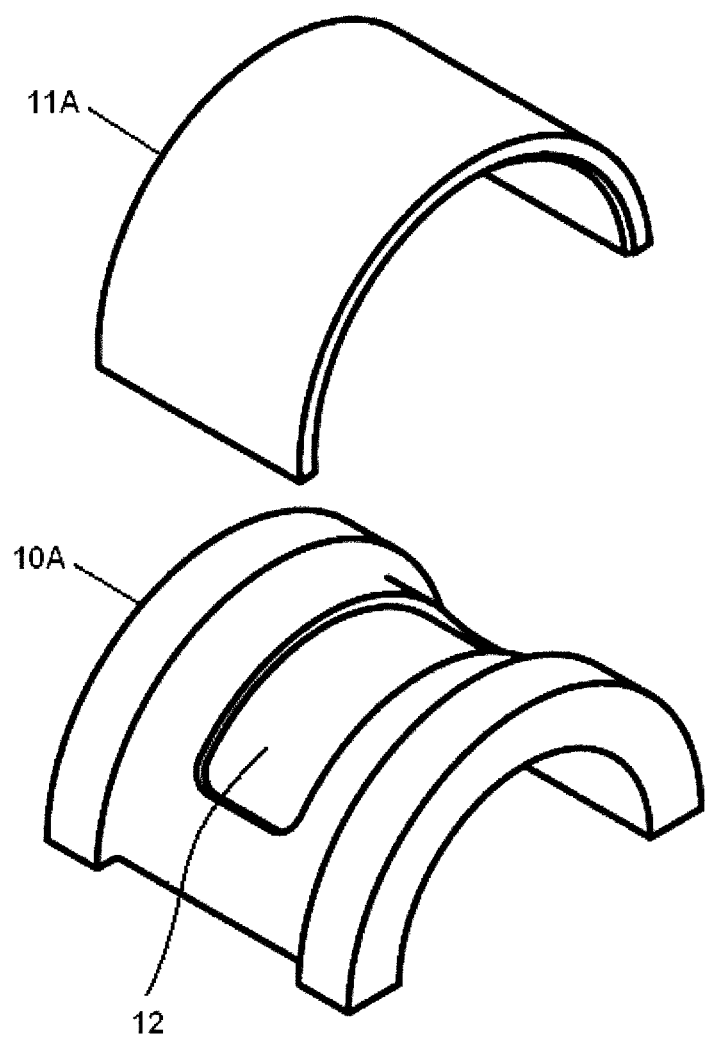
FIG. 6 is an exploded view of a hydrophone mandrel half for the streamer cable.
Figure 7A:
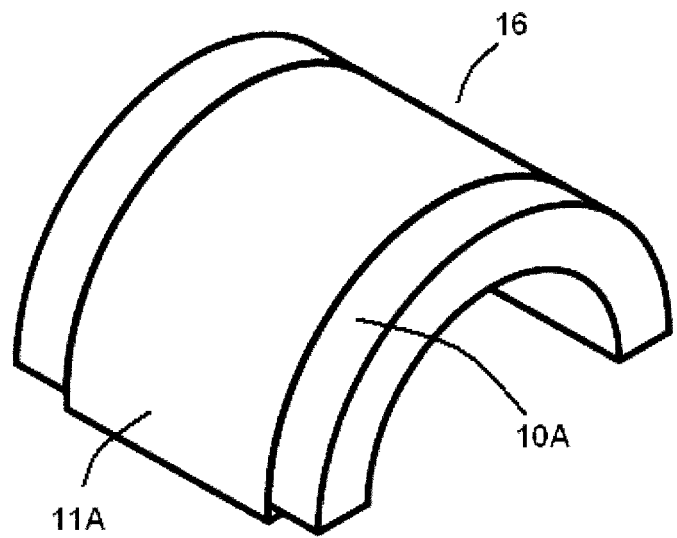
FIG. 7A is an isometric view of a hydrophone mandrel of the streamer cable according to the invention.
Figure 7B:
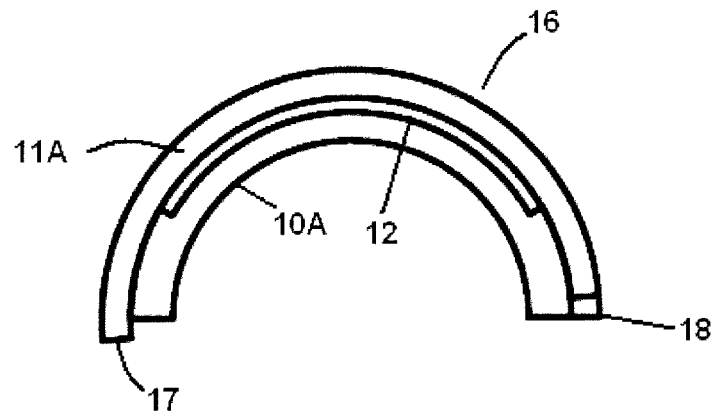
FIG. 7B is a cross section of a mid-section of the mandrel of FIG. 6A.

FIGS. 6, 7A and 7B illustrate a preferred embodiment of a hydrophone where the sensor base is formed by an assembly of half cylinders wherein the respective inner and outer cylinders are rotated slightly with respect to each other. FIG. 6 illustrates that the hydrophone sensor base can be provided by gluing or otherwise pre-assembling an inner $10_A$ and an outer $11_A$ cylindrical part to form one half of a sensor base. The hydrophone sensor base 3 is then completed by mounting two such half sensor bases onto the cable. The inner $10_A$ and outer $11_A$ cylindrical parts are designed so as to define an air filled, closed cavity when attached together, for example by providing a recess area 12 on the outer cylindrical surface of the inner cylindrical part $10_A$. Again, the inner cylindrical part may be made from a stiff material such as steel or hard plastic in order to provide a stiff structure while the outer cylindrical part is can be made from a compliant material, for example a plastic, thus providing a compliant structure.

Two such preassembled half sensor bases may be arranged together on the streamer. The half sensor bases are preferably arranged in a cut-out 50 of the extruded buffer layer of the cable.

A section of the optical fibre 1 is then wound tightly onto the hydrophone sensor base as described and in particular on the compliant part of the sensor base. The section of optical fibre that is wound onto the hydrophone is attached, for example by gluing the fibre at selected locations onto the hydrophone sensor base at the ends of the hydrophone section of the fibre.

The outer surfaces of the hydrophone sensor base 3, i.e., the outer surfaces of the outer cylindrical parts 11, are preferably arranged to be lower than the outer surface of the buffer layer 2 in order to protect the fibre from squeezing under the outer protective layer.

Each pair of inner cylindrical part and corresponding outer cylindrical part is assembled to form half cylinders 16 prior to mounting the half cylinders 16 onto the seismic cable to complete the hydrophone sensor base. This means that the air-filled cavity 12 can be pressure tested before being mounted on the streamer cable. As the attaching together of the two halves of a sensor base does not include any sealing of the air-filled cavity, the requirements on the mounting of the two halves of the sensor base are less stringent.

Upon reading the present disclosure a person skilled in the art will understand that within the scope of the present invention the inner and outer cylindrical parts may be designed in many shapes, forms and arrangements while still obtaining the split-element design required for enabling convenient and efficient assembly of a hydrophone, accelerometer or reference section and that the cavity 12 may take on a multitude of forms while still achieving the desired air-backing function of a hydrophone sensor base 3.

Figure 8:
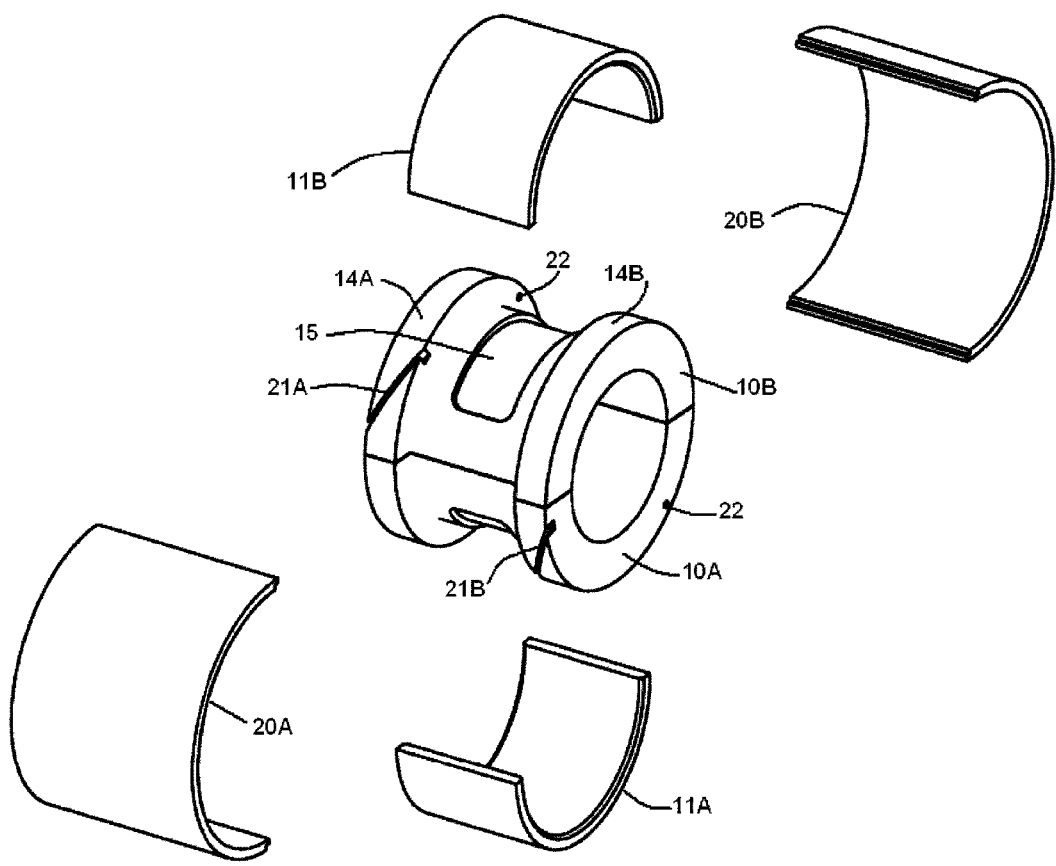
FIG. 8 is an exploded view of a hydrophone mandrel of the streamer cable showing grooves and covers.
Figure 9:
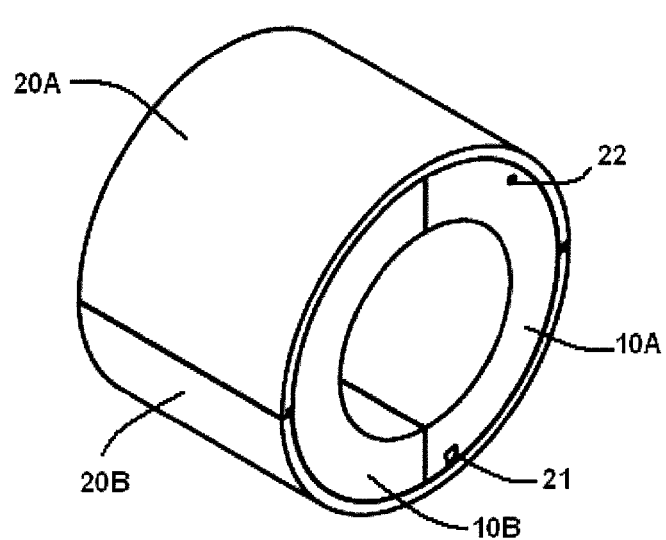
FIG. 9 is an isometric view of the hydrophone mandrel of FIG. 7.

FIGS. $7_A$ and $7_B$ illustrates how the outer cylindrical parts $11_{A\text{-}B}$ may be rotated slightly with respect to the corresponding inner cylindrical parts $10_{A\text{-}B}$, so that the outer parts $11_A$ forms a small protrusion 17 as viewed towards an end of the assembled half cylinder 16. The protrusion 17 and corresponding void 18 enables correct and accurate alignment of two corresponding half cylinders 16 with respect to each other in an efficient and accurate manner when completing the hydrophone sensor base. FIGS. 8 and 9 illustrate in an exploded view and an isometric view, respectively, how two hydrophone covers $20_{A,B}$ are arranged onto the hydrophone after the winding of the optical fibre onto the outer cylindrical parts $11_{A\text{-}B}$ of the hydrophone. The hydrophone covers $20_{A,B}$ serve to protect the compliant outer cylindrical parts $11_{A,B}$ and the optical fibre 1 of the hydrophone from external mechanical influences.

FIG. 8 also illustrates how the outer cylindrical parts $11_{A,B}$ may be provided with sensor base grooves $21_{A,B}$, preferably on shoulders $14_{A,B}$, of the outer cylindrical parts $11_{A,B}$ for allocating and protecting the part of the optical fibre entering and leaving the hydrophone to and from the hydrophone coil. The grooves $21_{A,B}$ are formed as helical grooves extending from an end of the hydrophone cylinder into the hydrophone optical fibre volume (sensor fibre volume) of the hydrophone section 3.

Figure 10A:
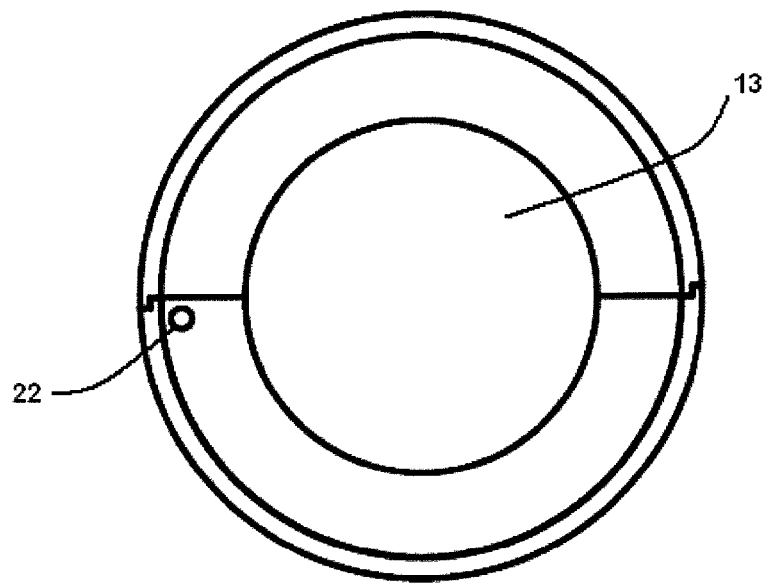
FIG. 10A is an end view of a hydrophone of the streamer cable.

FIGS. 8, 9 and 10A also shows an opening of a duct or channel 22 that extends from a sensor fibre volume in which the sensor part of the optical fibre is wound, the sensor fibre volume being between the outer cylindrical parts $11A_{,B}$ and the hydrophone covers $20_{A,B}$ and to an oil or gel filled void between the cable core part and an outer protective layer or cladding of the seismic cable. The channel 22 serves to ensure that the pressure inside the sensor fibre volume is equalized with respect to the pressure in the oil or gel filled voids between the core part and the outer protective layer or cladding of the seismic cable. The sensor fibre volume will thus also be gel or oil filled to ensure good acoustic coupling in the hydrophone. The channel 22 may be dimensioned so as to operate as a low-pass filter for the transfer of pressure changes into the sensor fibre volume. The diameter of the channel is typically one or a few tenths of a millimeter and the length of the channel is typically 3-5 millimeters. Such dimensions provide the low-pass filter effect. The mandrel grooves $21_{A,B}$ could also serve as openings into sensor fibre volume and act as the low-pass filter. In the case that a separate opening in the form of a duct or channel is provided, the mandrel grooves may be sealed.

The low-pass filter serves to reduce the problem of slew-rate associated with interferometric sensors and large signals, in particular rapid changes in the received signal, which for seismic applications typically can occur upon arrival of the first pressure wave from the acoustic source, typically an air gun. This problem is significantly reduced by the introduction of a mechanical low-pass filtering in the acoustic response of the hydrophones, as detailed above.

Figure 10B:
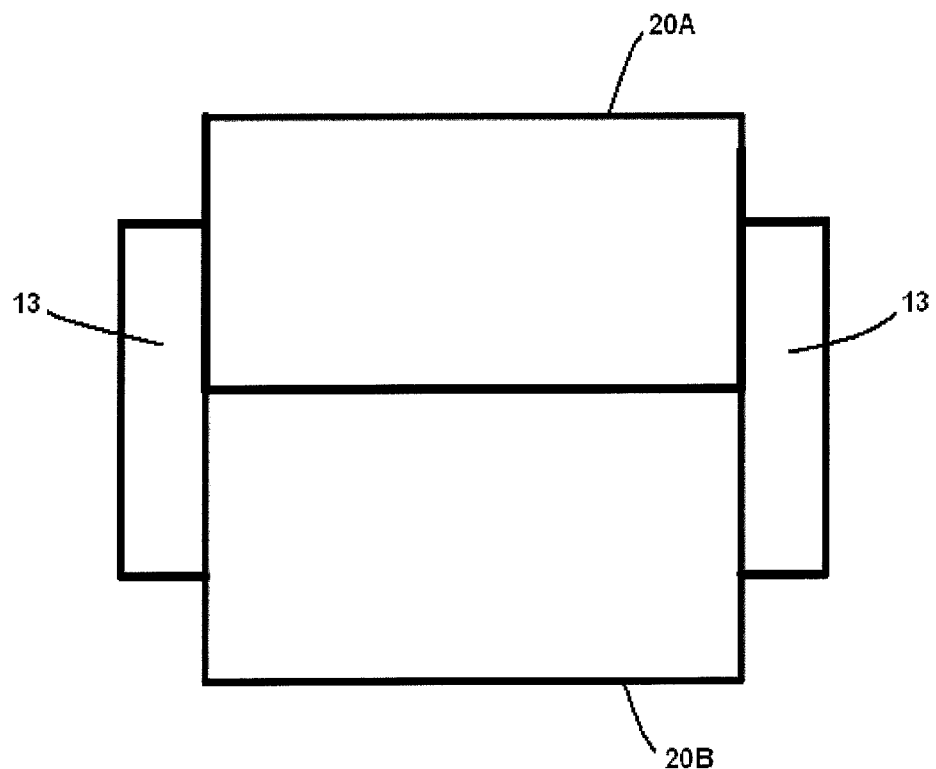
FIG. 10B is a side view of a hydrophone of the streamer cable.

FIG. 10B shows a side view of the hydrophone section 3 after being mounted in a cut-out of the buffer layer 2 of the seismic cable, the cut-out in this case being shown to extend all the way to the inner coating or armour layer 13.

In both of the above mandrel designs (hydrophone sensor base) the outer pressure sensitive parts, the outer cylindrical part in FIG. 3, and the pressure sensitive tube halves on FIG. 4, can be made from a transparent plastic so that the internal cavity may be inspected. Using a transparent plastic also means that it may be possible to use a glue which cures when exposed to light in the ultraviolet (UV) range.

If the required length of optical fibre between two FBGs of the sensor or reference mandrel is large, the optical fibre coil may be arranged in several layers.

Figure 11:
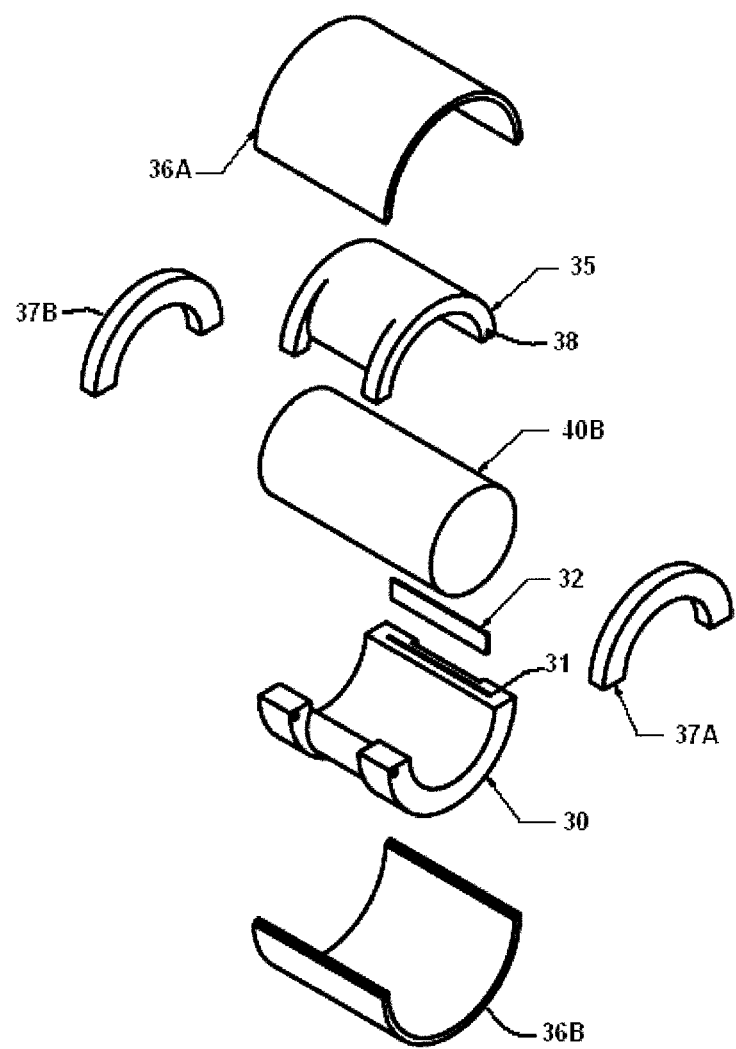
FIG. 11 is an exploded view of an accelerometer of the streamer cable.

FIG. 11 shows an exploded view of an accelerometer according to one aspect of the invention, which is designed from split-element components in a manner similar to the above described hydrophone. By using the split-element design, the accelerometer is particularly well suited for convenient and efficient assembly on a seismic cable according to the invention. The accelerometer of FIG. 11 may be mounted in one or more of the cut-outs 50 formed by the removal of a part of the buffer layer 2 in short sections of the seismic cable.

The accelerometer of FIG. 11 comprises a fixed part 30 and a movable part 35, the fixed part 30 being fixed in relation to the core of the seismic cable and the movable part 35 being movably attached 31, 32 to the fixed part using a flexible element such as for example a spring element 32. The fixed part 30 may be glued or otherwise fixed to the seismic cable in a cut-out 50 in the buffer layer 2 of the seismic cable. The fixed part 30 comprises first attachment means 31 for attaching the spring element 32 to the fixed part 30. The movable part 35 comprises second attachment means 38 for attaching the movable part 35 to the spring element 32, thus enabling the movement of the movable part in relation to the other cable part by means of flexure of the spring element 32. The fixed part 30 may be shaped as a half cylinder with first attachment means 31 in the form of a slit into which the spring element 32, possibly in the form of spring blade, may be affixed. The spring blade is also attached to the movable part 35 in order that the movable part may move with respect to the fixed part and the core of the seismic cable when the cable is accelerated in a transversal direction. Two accelerometer covers $36_{A,B}$ enclose the accelerometer. The covers $36_A$ are dimensioned so as to provide room for a limited movement of the movable element 32. Two end sealing components $37_{A,B}$ close the opening between the buffer layer 2 of the cable and the cover $36_A$ at each end, so that the movable element is within an essentially closed space. In one embodiment of the accelerometer according to the invention, an auxiliary protection layer is arranged between the armour layer 100 and the fixed and movable parts 30, 35 for providing a sealing towards the armour layer 13.

The benefit of arranging an accelerometer in the seismic cable according to the invention is that ghost reflections in measured hydrophone data from the sea surface may be reduced. Traditionally, the ghost notch effect acts as a filter on the data and restricts towing depths for the seismic cable to the range between six and nine meters. In rough weather conditions, it can be an advantage to tow the streamer cables deeper. Deeper towing will result in a ghost notch in the frequency interval of interest. By combining co-located vertical accelerometer and hydrophone sensor data this may be avoided. The dual-sensor summation will attenuate the spectral notches created by the sea surface effect. This may result in improved bandwidth, extension of weather operating window and possibly better signal-to-noise ratio.

Adding an accelerometer to the seismic cable also makes it possible to subtract the horizontally moving noise along the streamer. The so-called strum/tow noise propagates along the streamers stress members and can potentially be sensed by the accelerometers. This type of noise is typically in the range of 3 to 20 Hz.

Figure 12A:
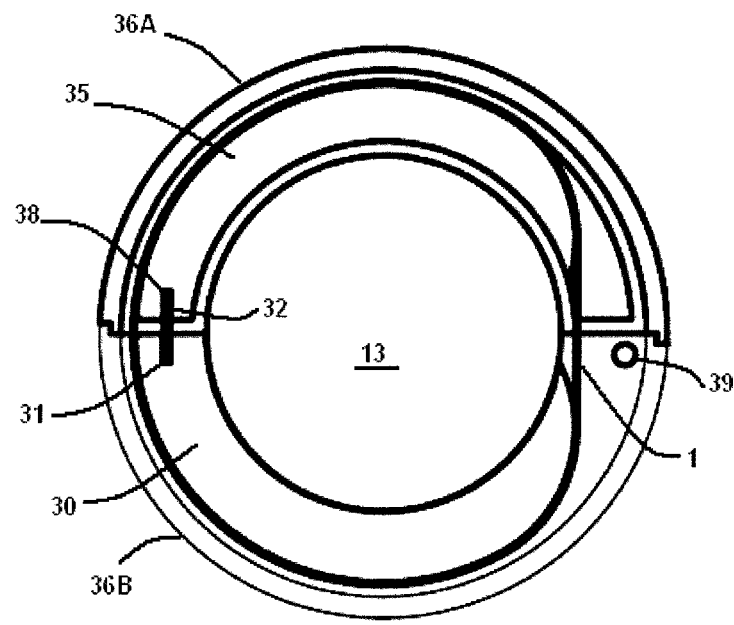
FIG. 12A is a cross sectional view of an accelerometer of the streamer cable.
Figure 12B:
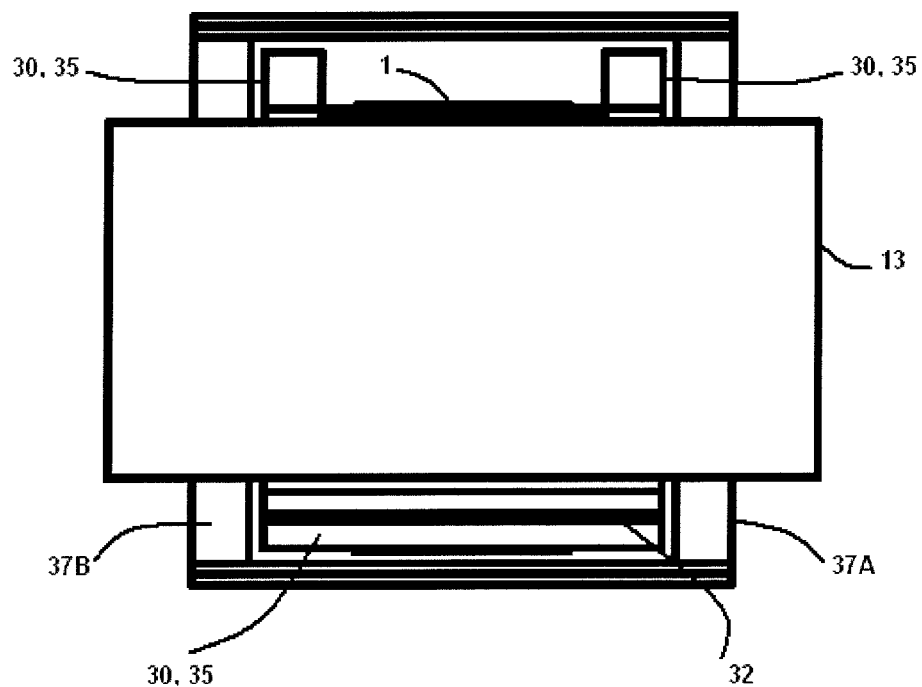
FIG. 12B is a longitudinal cross section of an accelerometer of the streamer cable.

FIG. 12A shows a transversal cross section of the accelerometer of FIG. 11 in assembled form with an optical fibre coil 1 included. An accelerometer channel 39, similar to the hydrophone channel 22, forms a pressure-equalizing duct extending from the space around the movable element 35 and to the exterior is shown. FIG. 12B shows a longitudinal cross section of an accelerometer the accelerometer of FIG. 12A. The channel 39 into the space surrounding the accelerometer fibre coil works as a DC-filter so that the accelerometer does not "see" acoustic pressure (which will result in cross-coupling from the acoustic pressure to the accelerometer). The accelerometer is also surrounded by oil in order to dampen possible resonances.

Figure 13A:
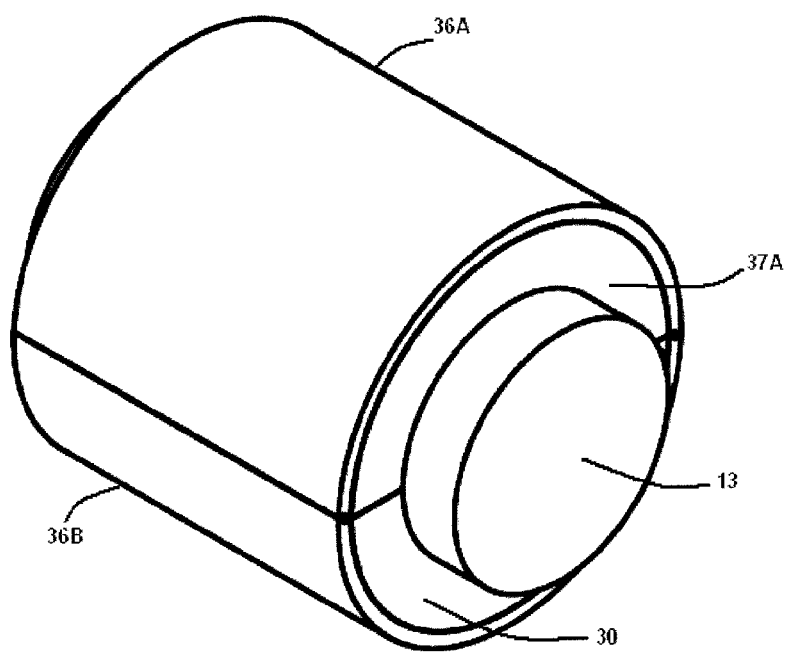
FIG. 13A is an isometric view of the accelerometer of the streamer cable with two covers mounted on the cable.

FIG. 13A is an isometric view of an accelerometer according to the invention as assembled on the seismic cable and with accelerometer covers $36_{A,B}$ mounted.

Figure 13B:
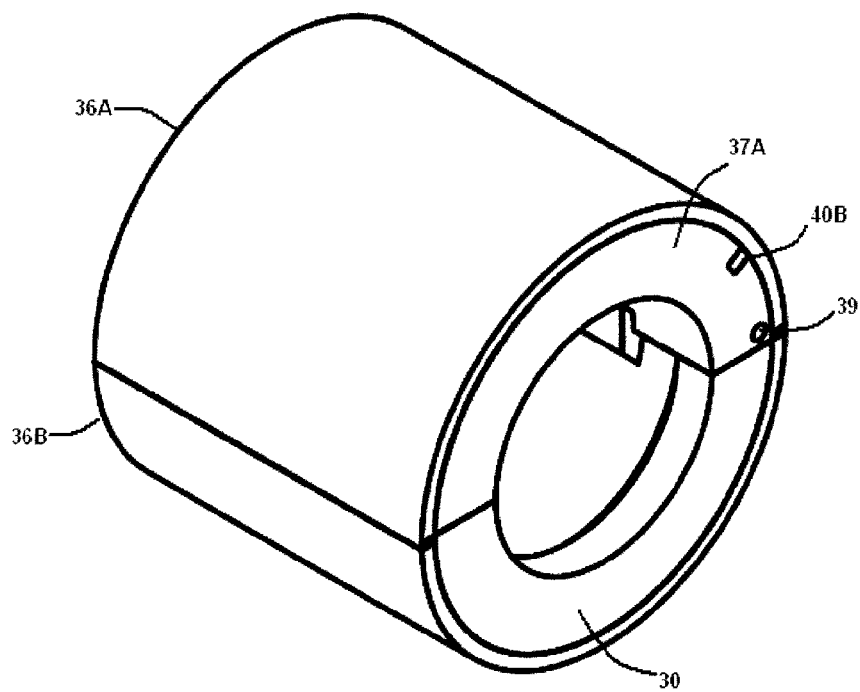
FIG. 13B is an isometric view of the accelerometer of the streamer cable with covers and groove.

FIG. 13B is a side view of the accelerometer of FIG. 13A without the core parts of the seismic cable.

Figure 14:
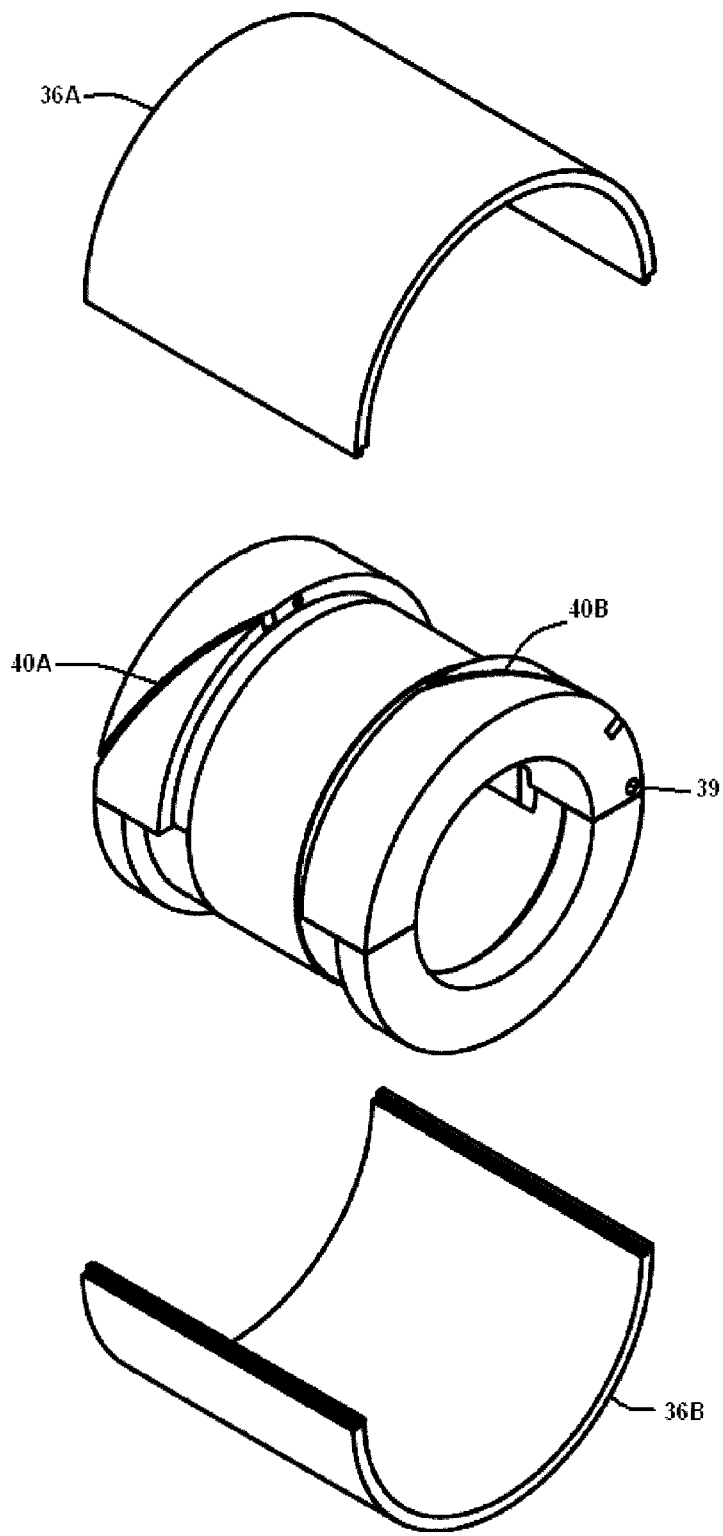
FIG. 14 is a view of the accelerometer with the two covers removed.

FIG. 14 shows the accelerometer of FIG. 13A with the accelerometer covers $36_{A,B}$ moved away from the other accelerometer parts. Fibre grooves $40_{A,B}$ are provided for accommodating and protecting the optical fibre entering and leaving the accelerometer. In some embodiments of the accelerometer according to the present invention the fibre grooves $40_{A,B}$ are not sealed, but are open so as to provide pressure equalization between the volume of the fibre sensor coil of the accelerometer and the surroundings of the accelerometer. In other embodiments of the accelerometer according to the present invention the fibre grooves $40_{A,B}$ are sealed and a separate opening 39 may be provided for pressure equalization of the fibre sensor volume of the accelerometer, as indicated on FIG. 14.

Figure 15:
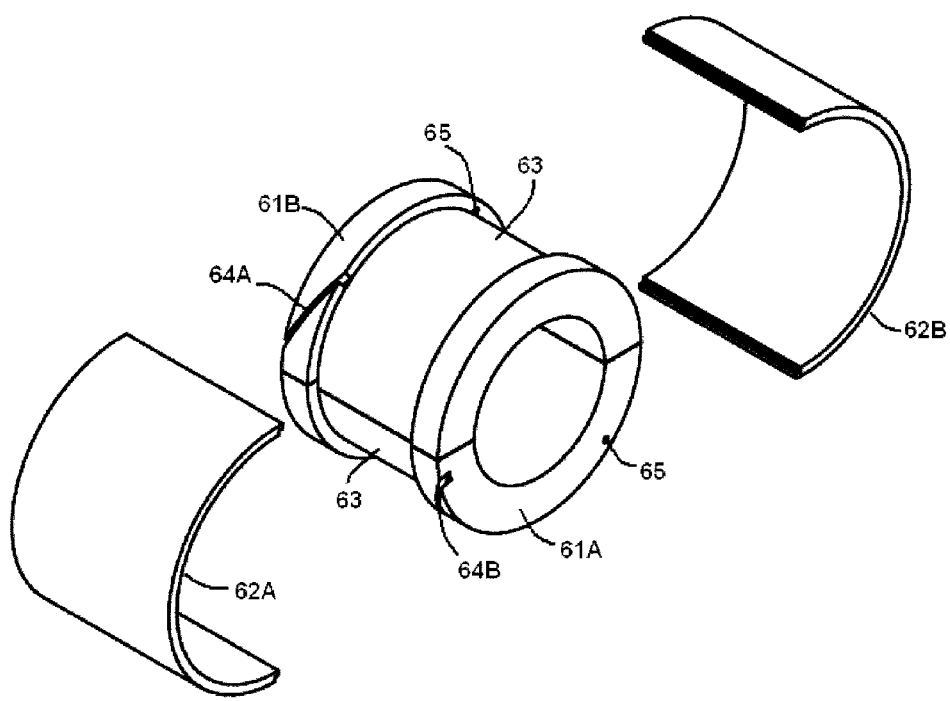
FIG. 15 illustrates a reference mandrel of the seismic cable according to the invention.

FIG. 15 illustrates a reference element which is produced and mounted onto the cable core part according to the same principles as the hydrophone and the accelerometer. Two inner mandrel parts $61_{A,B}$ have cylindrically shaped surfaces so that they can be attached together and around the cable core part in a cut-out 50. Two cover parts $62_{A,B}$ are mounted onto the inner mandrel parts $61_{A,B}$ so as to define a reference volume 63 wherein a fibre optic reference coil may be arranged. Similarly to the hydrophone and the accelerometer the reference element is provided with fibre grooves $64_{A,B}$ on the surface of the inner mandrel parts $61_{A,B}$ forming entry and exit ducts for the optical fibre into and out of the reference volume 63. The fibre grooves $64_{A-B}$ may be sealed so as to create a pressure tight, possibly air filled, reference volume 63. Alternatively, the reference volume may be oil filled and provided with a thin reference volume channel 65 as a pressure equalizing arrangement for the reference volume 63. An optical fibre reference coil may then be coiled as in the hydrophone, but now onto the inner mandrel parts of the reference element.

The inner mandrel parts $61_{A,B}$ and cover parts $62_{A,B}$ of the reference element are preferably made from a stiff material in order that the reference element do not compress or expand due to pressure variations, so that the optical fibre wound onto the inner mandrel parts $61_{A,B}$ remains virtually unaffected during pressure variations. The reference volume channel 65 may be designed so as to operate as a pressure wave filter, preferably with a low frequency cut-off at or under a frequency of 1 Hz.

Figure 16B:
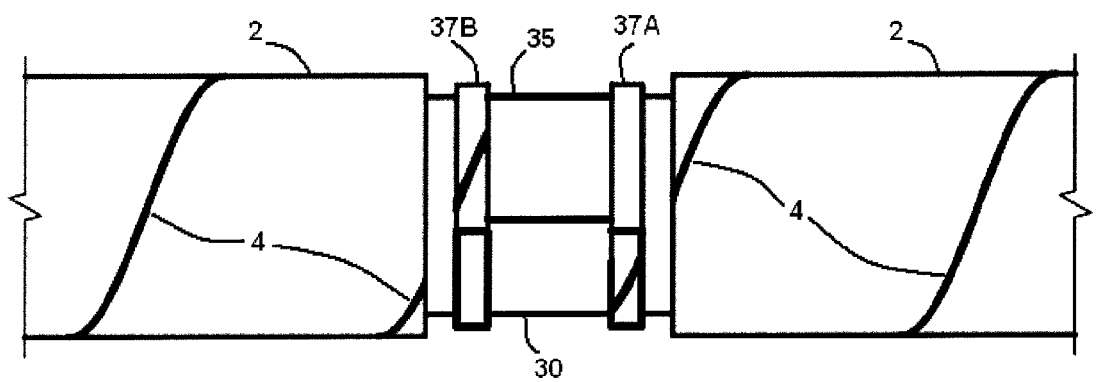
FIG. 16B is a side view of the mandrel of the streamer cable showing the hydrophone without covers.
Figure 16C:
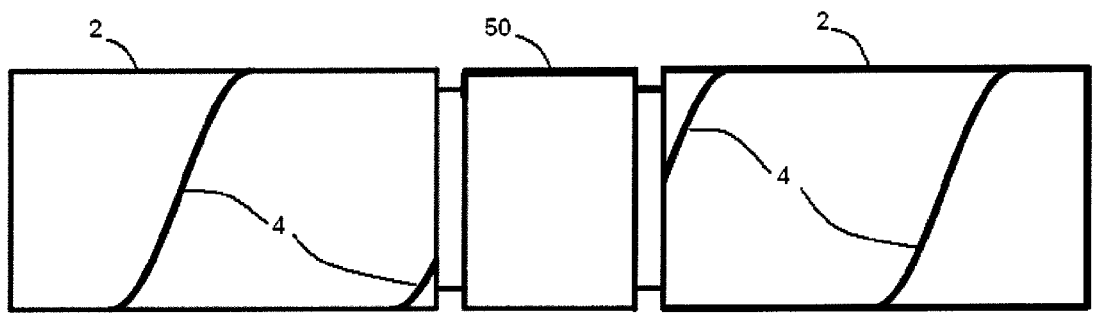
FIG. 16C is a side view of the mandrel of the streamer cable showing the hydrophone with covers as mounted.

FIGS. 16A-C illustrates the main steps in producing the sensor/reference mandrels on the seismic cable. FIG. 16A is a side view of a seismic cable with a cut-out 50 prepared between two sections of the buffer layer 2 for allocating a sensor or reference mandrel. The buffer layer is shown with grooves 4 for accommodating and protecting the optical fibre between the sensor/reference mandrels 50 along the seismic cable. FIG. 16B is a side view of a seismic cable with a sensor arranged in the cut-out 50. FIG. 16C shows the same as FIG. 16B with the sensor covers.

In one aspect of the invention, there is provided a method of producing a seismic cable according to the invention. The method will be described in more detail in the following with reference to the drawings of the seismic cable, the hydrophone and the accelerometer.

The streamer cable is produced in the following main steps. First, a multilayer core part is provided. The core part comprises a continuous buffer layer 2 for allocating and protecting an optical fibre and for providing buoyancy to the streamer cable.

Now, the assembly of the core part will be described in some more detail. The multilayer core part may be produced by first providing a fibre in tube structure 7, where the fibre is an auxiliary optical fibre which forms a transmission fibre running throughout a length of streamer cable. The tube 7 holding the fibre can be made either from plastic or metal, such as steel.

The tube is then provided with an inner protective coating 13 for protecting the tube 7. In one alternative, the tube is provided with a conductive foil 8, for example made of copper, between the tube 7 and the inner coating 13. The conductive foil 8 may be used to provide electric power and/or signaling to a tail buoy, a bird or other components that are arranged along the streamer cable and requires electric power.

The inner protective coating 13 may comprise a strength member so as to form an armour layer. The strength member can for example be made from a high strength material such as synthetic fibres, e.g., aramide fibres, for example Kevlar® or other similar materials, for example available under the trade names of Nomex® or Technora®. Around the armour layer 13, there may be arranged a wound tape layer, for example from a polyester or Mylar tape. As an alternative or supplement to the conductive foil 8 for communication and power supply to birds and other elements, one or more electric conductors may be arranged as part of the armour layer 13. The armoring protects and isolates the electric conductors as well as the fibre-containing tube 7.

Then the addition of the buffer layer 2 will be described in some more detail. A buffer layer 2 is added, preferably by an extrusion process. The buffer layer 2 has the function of protecting the optical fibre 1 to the hydrophones, accelerometers and references and of providing buoyancy. Grooves 4 along the buffer layer 2 for allocating the optical fibre 1 and possibly also for an electric conductor may be produced during the extrusion process or in the subsequent stage.

The buffer layer is made from a material which can be machined or otherwise removed. In this way, the cut-outs 50 can be made in the buffer layer 2 by removing the buffer layer 2 fully or at least partially at selected locations along the cable thereby providing cut-outs 50 defining spaces for sensor and reference mandrels. Some cut-outs 50 may also be provided for allocating other elements such as for example attachment and/or communication means for birds. The cut-outs 50 may be shaped as slots in the buffer layer 2 with a rectangular or stepped profile as seen transversally to the cable. The cut-outs 50 may not extend all the way to the armouring layer 100, thereby leaving a part of the buffer layer 2 under each cut-out 50. This can help to make the structure more stable in that it is avoided that the buffer layer 2 is effectively divided in many short segments by the cut-outs 50. The core part of the seismic cable and the buffer layer 2 can be produced by conventional cable manufacturing techniques. The buffer layer may be made in an ordinary cable extruder. A helical groove 4 for an optical fibre can be produced in the surface of the buffer layer 2 during the extrusion process.

Thirdly, the hydrophone sensor base parts (forming the hydrophone mandrels) of the optical fibre hydrophones (FIG. 5A-B) and/or optical fibre accelerometers are arranged in the cut-outs 50 to form the sensors of the seismic streamer. The two inner half cylinders $10_A$ of the hydrophone mandrel may be bonded or glued together around the core part of the cable where the buffer layer 2 has been removed. The two inner half cylinders $10_{A-B}$, which may be produced in steel, may be glued or bonded together on the outer surface of the core part of the cable. The glue joint, which may have a defined thickness of, for example, about 0.2 mm, may be arranged in an outwardly directed manner in order that it may be inspected after the glue has cured. Thereafter the two outer cylindrical parts $11_A$ forming the compliant or pressure sensitive parts of the hydrophone are glued to the inner cylindrical parts.

The outer cylindrical parts may be designed so as to form halves of a tube forming the pressure sensitive part. The outer cylindrical parts may also be glued with a glue joint having a defined thickness, of, for example, about 0, 2 mm, with the glue joint being arranged directed inwardly between the two tube halves and directed outwardly in the contact surface with the steel cylinders. The outer cylindrical parts $11_A$ may be made from a transparent plastic material so that most of the glue joints towards the inner cylindrical parts and the internal glue joint between the two outer cylindrical parts may be easily inspected. The process of mounting the sensor/reference mandrels and split coils for bird powering/communication may easily be automated.

The accelerometer of the seismic cable may be arranged in the cut-outs 50 in a manner similar to the hydrophone. The split-element accelerometer is well suited for mounting into a cut-out 50. First, the fixed part 30 of the accelerometer is attached into the cut-out 50, for example by gluing the fixed part 30 to the outside surface of the core part in the cut-out 50. The fixed part 30 becomes fixed by this attachment. Next, a movable part 35 is attached to the fixed part 30 using a spring element 32. The spring element 32 ensures that the movable part 35 is allowed to move as determined by the spring element 32 and the space surrounding the movable part 35. The spring element 32 can be attached to the fixed part 30 using first attachment means 31, for example, in the form of a slit 31 in the fixed part into which a first part of the spring element 32 in the form of a blade may be inserted. The movable part 35 may have similar second attachment means 38, which also can be slit formed so that second part of the blade formed spring element may be inserted into the second attachment means 38.

When mounted together by the spring element 32, the fixed and movable parts surrounds most of the cable core circumference, leaving a small opening on the opposite side of where the spring element is located. The small opening is required to provide freedom of movement for the movable part 35.

Two end sealing components $37_{A,B}$ are fixed to the cable core part at each end of the movable part as seen in the direction of the cable.

Then the optical fibre accelerometer sensing coil 1 can be coiled onto the combination of the fixed part 30 and movable part 35. The optical fibre entering and exiting the accelerometer may be arranged in grooves $40_{A,B}$ which may be provided in the fixed part 30 and/or the end sealing components $37_{A,B}$, as indicated on FIG. 14.

After the fibre accelerometer sensing coil has been arranged two or more accelerometer covers 36A,B may be mounted onto the fixed part 30 and movable part 35, respectively, for protection of the fibre sensing coil of the accelerometer.

A general principle of the structure of the hydrophone, the accelerometer and the reference element is that the optical fibre is wound onto the cable with a pitch as required for the sensor, reference or mandrel sections, after all the parts that have to be located under the optical fibre are in place on the central structure of the streamer cable. Cover parts of the hydrophone, the accelerometer as well as the reference element are mounted prior to providing an outer protective layer.

Next, the preparation of the fibre layer consists of three steps:

1. Remove/strip buffer layer to provide cut-outs,
2. Mount sensor/reference elements, and
3. Wind fibre and fibre coils.

All parts that shall be under the optical fibre 1 have to be provided first. This is performed in two steps. Initially, the buffer layer 2 is removed, for example by a machining process, at desired locations along a specified length of the seismic cable. At each location where the buffer layer 2 has been removed, cut-outs 50 are created.

In each cut-out 50, there is arranged a hydrophone, an accelerometer, a reference section or a signal coil/mechanical attachment for a bird or similar structure. All of these are preferably designed as split-element structures, possibly in two-part forms in order to enable convenient and efficient mounting around the central structure of the seismic cable.

Following the above, the optical fibre 1 is wound onto the buffer layer 2 and onto the sensor/reference mandrels. The optical fibre is provided with fibre Bragg gratings (FBGs) either in a separate process stage before being wound onto the cable structure or as a continuous process during or after the winding. The optical fibre 1 will be attached, for example by gluing, at selected points on the streamer, and the FBGs are preferably arranged at selected positions with reference to the gluing points. The pitch and strain of the optical fibre 1 is adapted for the individual components. The strain varies from near zero for the fibre resting in the grooves/recesses and to a sufficient pretension on the hydrophone mandrel.

To ensure that the fibre is unstrained after integration into the groove of the mandrel, the groove may in one example be filled with grease, wax or other material which is soft at operating temperatures and hard at lower temperatures. By cooling the material prior to winding the fibre into the groove, the fibre will sink into the groove at operating temperatures, providing an excess length of fibre.

An alternative method of providing an excess fibre length in the groove is to fill the groove with an initially hard and chemically dissolvable, material which thus can be removed by a chemical process after fibre winding.

Yet another alternative is to arrange the optical fibre onto a shrinkable element arranged in the buffer layer grooves. The shrinkable material is typically a material whose diameter may be reduced by heating, such as crimp sleeves.

Still yet, an alternative method for providing an excess fibre in the grooves is to strain the central structure during winding on the fibre, then relaxing the strain.

Ensuring that the fibre is unstrained after integration into the groove by providing an excess length of fibre in the groove also serves to avoid the potential problem that the section of optical fibre between a grating and a sensor coil is part of the active fibre, that is the length of fibre between two neighbouring gratings defining an interferometer, and has to be provided with an excess length so that cable strain and acoustic waves (cable induced noise) is not coupled to the sensors.

To complete the optical fibre layer the cover parts of the sensor and reference mandrels are mounted to protect the optical fibre after the winding step.

Finally, an outer protective layer or cladding is provided by first filling all voids, including the sensor fibre cavities, with a gel or oil by pulling the cable core part, the completed sensors and the wound fibre through a die. Then a tape, possibly a Mylar tape is wound onto the structure before an outer protective cladding is extruded as a last step. The gel filling may also be performed as a running, continuous process along the whole length of the seismic streamer cable during its assembly. In some embodiments of the method of producing the seismic cable, however, the sensor fibre cavities may be filled with a gel or oil in a separate stage, for example during or after mounting the sensor cover parts.

As all the production steps can be performed as running, continuous processes in a production line, it is possible to produce long lengths of streamer cable in an efficient manner.

The other components for a completing a streamer cable based seismic surveying or monitoring system may be adapted from already existing technical solutions. Top-side optoelectronic equipment may for example utilize existing Optoplan technology for the interrogation of the FBGs.

FIG. 17A-D illustrates schematically various arrangements of the fibre Bragg gratings in an optical fibre in a seismic streamer cable according to the present invention. Several possible designs of a seismic cable incorporating optical fibre sensors are shown. FBG1-FBGn denote optical fibre Bragg gratings, H1-Hn denote sensors (e.g., hydrophones) and $\lambda1$, $\lambda2$ denote the Bragg wavelengths of the gratings.

FIG. 17A shows a design with hydrophone (sensor) coils H1-Hn arranged between sections of optical fibre wound onto the buffer layer. The optical fibre wound onto the buffer layer may comprise multiple fibre Bragg gratings FBG1-FBGn arranged so that for each hydrophone (sensor) coil there is a corresponding pair of gratings, one on each side of the hydrophone coil, where two neighbouring sensors share one grating. The gratings in a sensor group with n hydrophones have the same wavelength to allow time multiplexing of sensors within one sensor group. The next sensor group will have different grating wavelengths to allow wavelength multiplexing of subsequent sensor groups.

FIG. 17B illustrates how several hydrophone (sensor) coils H1-Hn may be arranged on the seismic streamer cable between two fibre Bragg gratings FBG1-FBG2. This configuration provides spatial averaging, enabling an increase in the signal-to-noise ratio in the sensor system.

FIG. 17C and FIG. 17D illustrate an embodiment of the seismic streamer cable with several hydrophone (sensor) coils H1-Hn and where each hydrophone (sensor) coil has a respective pair of fibre Bragg gratings FBG1-2, arranged close to the hydrophone (sensor) coil H1. In this way, there will be virtually no active hydrophone (sensor) fibre outside the sensor coils (sensor mandrels). This is expected to reduce cable-induced noise on the hydrophone.

The fibre Bragg gratings of FIG. 17A-C may be interrogated by time division multiplexing (TDM) to obtain values representing the status of the hydrophone, accelerometer or reference coils. The sensors may be grouped, for example with ten sensors in each group, and by allocating twenty wavelength channels, one wavelength channel for each group, it may be possible to have more than 200 sensors (hydrophones/accelerometers) along an optical fibre 1 in one seismic cable or seismic cable module.

In the configuration in FIG. 17C, the fibre wound on the buffer layer between the sensors (hydrophones and/or accelerometers) acts as a separate interferometer spaced by two FBGs. This interferometer will pick up cable-induced strain on the coiled fibre. The fibre may be tightly coiled so that the interferometer acts as a distributed strain sensor. The strain sensor is formed by the wound optical fibre between two spaced FBGs arranged on each side of two neighbouring sensors. In such a way, the distributed strain sensor may be used to measure and compensate for cable-induced noise on the hydrophones. Hence, only every second interferometer functions as a hydrophone, while the other interferometers function as strain sensors. This configuration doubles the required number of fibre Bragg gratings and halves the number of time-division multiplexed channels available for hydrophones.

In some embodiments of the seismic cable according to the invention, an FBG network may be provided as in FIG. 17D where the pair of FBGs, one FBG on each side of the hydrophone, has the same wavelength, while a next pair of FBGs, with one FBG on each side of a following hydrophone, has a different wavelength. This will provide a purely wavelength multiplexed network (no time division multiplexing), limiting the number sensors/channels along a single fibre. In return, the fibre between the hydrophones will not be active. This will require negligible reflection from FBGs on neighbouring hydrophones, which will limit the wavelength channel spacing.

In summary, there is provided a seismic streamer cable which can be efficiently manufactured due to its split-element sensor structures making them easy to assemble on a cable core part. The split-element sensor structure make it simple to integrate the sensors in a low diameter seismic cable having a diameter below 35 mm, even at about 30 mm. Due to the non-electric type sensors the streamer cable according to the invention provides a reliable construction.

A major advantage of the present invention is that it allows great flexibility in the design of the seismic streamer because the sensors and reference mandrels are all modeled on the same split element structure for easy and efficient assembly on the cable into the same or very similar cut-outs in the buffer layer of the cable.

Thus, seismic cables may be produced with a large variation in sensor spacing, number and mixture of hydrophones, accelerometers, reference sections, etc.

A high design-flexibility enables a large degree of custom-made cable designs, being suited to a large variety of design parameters.

While the foregoing is directed to embodiments of the present invention, other and further embodiments of the invention may be devised without departing from the basic scope thereof, and the scope thereof is determined by the claims that follow.

The invention claimed is:

1. A hydrophone for integration into a seismic streamer cable, characterized by:
    a split-element sensor base for being arranged into a cut-out in a buffer layer of a seismic cable, the base comprising a plurality inner parts and a plurality of compliant outer parts;
    each pair of one inner part and one outer part being assembled so as to form a cavity, when assembled together, each pair being arranged in the cut-out, the plurality of pairs forming a plurality of cavities; and
    an optical fibre being coiled onto the plurality of compliant outer parts of the sensor base when assembled together on a streamer cable so as to form a hydrophone being sensitive to pressure variations, the hydrophone being comprised by the split-element sensor base and the optical fibre.

2. The hydrophone of claim 1, wherein the split-element sensor base comprises two inner half cylinders attached together to form an inner tube and two compliant outer half cylinders being rotated with respect to the inner half cylinders and attached together to the inner tube so as to form an outer tube, whereby each cavity between the inner and outer tube is formed when the hydrophone is mounted on a cable core part.

3. The hydrophone of claim 1, wherein each pair of one inner part and one outer parts is pre-assembled forming one of the plurality of cavities prior to being mounted on a streamer cable.

4. The hydrophone of claim 2, wherein the outer half cylinders are provided with helical grooves for allocating and guiding the fibre over part of the hydrophone.

5. The hydrophone of claim 2, comprising covers which serve to protect the compliant outer half cylinder and the optical fibre of the hydrophone from pressure waves, seismic signals and other external influences.

6. The hydrophone of claim 1, comprising a channel that extends from a space containing the fibre to oil or gel filled voids between the cable core part and an outer protective layer or cladding of the seismic cable, the channel serving as a low-pass acoustic filter for coupling from the external environment to the hydrophone.

7. The hydrophone of claim 2, wherein the two outer half cylinders form a plastic tube having an air backing in the form of the plurality of cavities.

8. The hydrophone of claim 1, wherein the set of stiff inner parts and compliant outer parts are generally shaped as halves of a cylinder in order to fit smoothly around a core part of the cable when assembled.

* * * * *